US012265009B2

(12) United States Patent
Hoeng et al.

(10) Patent No.: US 12,265,009 B2
(45) Date of Patent: Apr. 1, 2025

(54) TEST CHAMBER APPARATUS FOR ASSESSING FILTER MEDIA

(71) Applicant: PHILIP MORRIS PRODUCTS S.A., Neuchâtel (CH)

(72) Inventors: Julia Hoeng, Corcelles (CH); Arkadiusz Kuczaj, Courtaman (CH); Antonin Sandoz, Neuchâtel (CH); Sandro Steiner, Arch (CH)

(73) Assignee: Philip Morris Products S.A., Neuchâtel (CH)

( * ) Notice: Subject to any disclaimer, the term of this patent is extended or adjusted under 35 U.S.C. 154(b) by 277 days.

(21) Appl. No.: 18/001,971

(22) PCT Filed: Jun. 25, 2021

(86) PCT No.: PCT/IB2021/055693
§ 371 (c)(1),
(2) Date: Dec. 15, 2022

(87) PCT Pub. No.: WO2022/003517
PCT Pub. Date: Jan. 6, 2022

(65) Prior Publication Data
US 2023/0228665 A1 Jul. 20, 2023

(30) Foreign Application Priority Data
Jul. 2, 2020 (EP) .................................... 20183697

(51) Int. Cl.
*G01N 1/22* (2006.01)
*G01N 15/08* (2006.01)

(52) U.S. Cl.
CPC ........... *G01N 15/0806* (2013.01); *G01N 1/22* (2013.01); *G01N 2001/2282* (2013.01); *G01N 2015/084* (2013.01)

(58) Field of Classification Search
CPC ................. G01N 15/0806; G01N 1/22; G01N 2001/2282; G01N 2015/084;
(Continued)

(56) References Cited

U.S. PATENT DOCUMENTS 3,204,449 A 9/1965 Fordyce
4,069,704 A * 1/1978 Grant, Jr. ............. A24C 5/3418 73/41
(Continued)

FOREIGN PATENT DOCUMENTS

GB 2267661 A 12/1993
WO 213/064503 A1 5/2013

OTHER PUBLICATIONS

Extended European Search Report for EP 20183697.0 issued by the European Patent Office on Mar. 30, 2021; 11 pgs.
(Continued)

*Primary Examiner* — David J Bolduc
(74) *Attorney, Agent, or Firm* — Mueting Raasch Group

(57) ABSTRACT

An apparatus includes (i) a test chamber having an inlet and an outlet; (ii) an introduction system configured to introduce a test pollutant into the test chamber such that the test pollutant is entrained in air flowing from the inlet to the outlet; (iii) a support configured to retain the test article, wherein the support defines a passageway downstream of a location of the test article such that air flowing from the inlet to the outlet passes through the filter medium prior to entering the passageway; (iv) an air flow apparatus configured to draw air from within the test chamber through the passageway and the outlet; and (v) a respiratory conditions simulation system configured to simulate an aspect of respiration, an external environment simulation system configured to simulate an aspect of an external environment, or
(Continued)

both the respiratory conditions simulation system and the external environment simulation system.

14 Claims, 11 Drawing Sheets

(58) Field of Classification Search
CPC ......... G01N 1/2202; G01N 2001/2223; G01N 15/08; G01N 1/24
See application file for complete search history.

(56) References Cited

U.S. PATENT DOCUMENTS 4,171,635 A * 10/1979 Calleson .............. A24C 5/3418 73/38
4,184,360 A * 1/1980 Vadnay ................ A24C 5/3406 73/28.01
4,341,109 A * 7/1982 Evans, Jr. ................ A24C 5/34 356/640
4,471,650 A * 9/1984 Koch ................... A24C 5/3418 73/41
4,627,448 A * 12/1986 Kamm ................. A24C 5/3418 131/273
5,059,348 A * 10/1991 Guelta ..................... C06D 3/00 73/40
5,059,350 A * 10/1991 Carlon ................. G01N 15/082 356/336
5,059,352 A * 10/1991 Carlon ..................... C06D 3/00 356/336
5,059,353 A * 10/1991 Carlon ................. G01N 15/082 356/336
5,076,965 A * 12/1991 Guelta ................... G01N 15/08 356/336
5,080,829 A * 1/1992 Carlon ............... G01N 15/0826 356/336
5,094,779 A * 3/1992 Carlon ................... A62B 27/00 356/336
6,273,087 B1 * 8/2001 Boussignac ....... A61M 16/0858 128/204.22
8,567,391 B2 * 10/2013 Ohmura ............. A61M 16/161 128/201.13
2008/0257368 A1 10/2008 Wilson et al.
2018/0209890 A1 * 7/2018 Case .................. G01N 15/0806
2022/0186280 A1 * 6/2022 Ozseyhan ................ C12Q 1/06

OTHER PUBLICATIONS

International Search Report and Written Opinion for PCT/IB2021/055693, issued by the European Patent Office on Sep. 22, 2021; 12 pgs.

International Preliminary Report on Patentability for PCT/IB2021/055693 issued by the European Patent Office on May 23, 2023; 11 pgs.

ASTM 2101—Standard Test Method of Evaluating the Bacterial Filtration Efficiency (BFE) of Medical Face Mask Materials, Using a Biological Aerosol of *Staphylococcus aureus*, Designation: F2101-14;Jul. 2014: 5 pgs.

Wake et al., "Performance of Respirator Filters and Surgical Masks Against Bacterial Aerosols," *J Aerosol Sci*, 1997;28(7): 1311-1329.

* cited by examiner

TEST CHAMBER APPARATUS FOR ASSESSING FILTER MEDIA

This application is the § 371 U.S. National Stage of International Application No. PCT/IB2021/055693, filed 25 Jun. 2021, which claims the benefit of European Application No. 20183697.0, filed 2 Jul. 2020.

The present disclosure relates to an apparatus for assessing a filter medium of a test article. The present disclosure also relates to an apparatus that simulates an aspect of respiration, or simulates an aspect of an external environment, or simulates both an aspect of respiration and an aspect of an external environment.

Masks or other wearable devices may comprise a filter medium that reduces amounts of pollutants from an external environment that are inhaled by a subject. Examples of pollutants that may be filtered by the media include chemical compounds or complexes, dust or other particles, and biological materials such as pollen, bacteria, and viruses.

Airflow dynamics and physiological aspects of respiration may affect the ability of the filter medium of the wearable device to filter pollutants and may affect the ability of the pollutant to interact with the subject. Among other things, air flow rate, humidity, temperature, and carbon dioxide context of inhaled or exhaled air may affect the ability of the medium to filter the pollutant or may affect the pollutant itself.

Similarly, the external environment in which the pollutant is present and the nature by which the pollutant is introduced into the external environment may affect the ability of the pollutant to interact with the subject. Among other things, environmental temperature, humidity, and ultraviolet light may affect the ability of the medium to filter the pollutant or may affect the pollutant itself.

According to aspects of the present invention, there is provided an apparatus for assessing a filter medium of a test article. The apparatus comprises a test chamber, an introduction system, a support, an air flow apparatus, and (i) a respiratory conditions simulation system, (ii) an external environment conditions simulation system, or (iii) both the respiratory conditions simulation system and the external environment simulation system. The test chamber comprises an inlet and an outlet. The introduction system is configured to introduce a test pollutant into the test chamber such that the test pollutant is entrained in air flowing from the inlet to the outlet. The support is configured to retain the test article. The support defines a passageway downstream of a location of the test article such that air flowing from the inlet to the outlet passes through the filter medium prior to entering the passageway. The air flow apparatus is configured to draw air from within the test chamber through the passageway and the outlet. The respiratory conditions simulation system is configured to simulate an aspect of respiration. The external environment simulation system is configured to simulate an aspect of an external environment.

Examples of aspects associated with respiration that may be simulated by the respiratory conditions simulation system include one or more of air flow volume, air flow rate, air flow periodicity, temperature, humidity, acidity, carbon dioxide content, and the like. Examples of aspects of an external environment that may be simulated by the external environment simulation system include one or more of temperature, humidity, ultraviolet light, nature of the emission of the test pollutant, and the like.

By simulating an aspect of respiration, an aspect of an external environment of a subject, or both an aspect of respiration and an aspect of an external environment, the apparatuses of the present invention advantageously allow for assessment of the test article under conditions that may more closely resemble conditions in which the test article may be used. In addition, the test article may be assessed under a variety of conditions to determine potential effectiveness of the article. Such testing may, for example, allow for a user, a manufacturer, or a user and a manufacturer to determine whether certain conditions exist in which the test article may perform well and in which the test article may not perform well. This may allow a user to effectively employ the test article. Testing under a variety of conditions may allow a manufacturer to better instruct a user how to effectively employ the test article.

The apparatus of the present invention may comprise any suitable test chamber. The test chamber comprises an inlet and an outlet. Air may flow through the test chamber from the inlet to the outlet. A check valve or other suitable valve may be operably coupled to the inlet. The valve coupled to the inlet may permit air to flow into the test chamber through the inlet and may inhibit air from flowing out of the test chamber through the inlet.

The test chamber may comprise one or more vents. The vents may allow air within the chamber to escape the chamber when relative pressure in the chamber sufficiently increases or surrounding air to enter the chamber when relative pressure in the chamber sufficiently decreases. The vents may comprise filters to prevent or reduce test pollutants from exiting the test chamber through the vents or to prevent pollutants from the surroundings to enter the test chamber through the vents. The filters may comprise any suitable filter material, such as high efficiency particulate air (HEPA) filter material or charcoal filters.

The test chamber may comprise an opening through which the test pollutant may be introduced. The opening may be the same as, or different from, the inlet. Preferably, the test pollutant is introduced into the test chamber through an opening other than the inlet.

The test chamber may comprise a frame configured to retain one or more panels defining an enclosed interior space. The frame may be formed from any suitable material. The frame may comprise an inert material. Preferably, any portion of the frame that may be in communication with the enclosed interior volume of the test chamber is inert. The frame, or portions of the frame, may be coated or treated to be inert. The frame may comprise plastic, such as polycarbonate, or metallic material, such as aluminium or stainless steel.

The panels may be formed from any suitable material or materials. Preferably, at least a surface of a panel that defines the interior of the test chamber is inert. Any suitable inert material may be used. The inert material may form the bulk of the panel or may be coated on the surface of the panel. Preferably, the surface of the panel that defines the interior of the test chamber is hydrophobic.

Examples of suitable materials for forming the bulk of the panels include glass, plastic, and metallic materials. Examples of suitable plastic materials include polycarbonate, polyetheretherketone (PEEK), poly (methyl methacrylate) (PMMA), and the like. Examples of suitable metal materials include aluminium, stainless steel, and the like. The materials may be inherently inert or may be treated or coated to be inert. For examples, coatings or treatments may be applied to the surface to render surfaces inert.

Preferably, at least one panel is transparent to allow visual observation of the enclosed interior space. The entire panel or a portion of the panel may be transparent. Preferably, the entire panel or a major portion of the panel is transparent.

Suitable transparent materials for forming the panels include transparent plastics or glass. Visual observation of the enclosed interior space may allow a user of the test apparatus to determine whether the testing process is proceeding as expected.

The test chamber may comprise more than one panel. For example, the test chamber may comprise a top panel, a bottom panel, and one or more sidewall panels. In some examples, the test chamber comprises a top panel, a bottom panel, a front sidewall panel, a back sidewall panel, a left sidewall panel, and a right sidewall panel.

Preferably, the frame sealingly engages the panels such that the enclosed interior volume of the test chamber is airtight relative to an ambient environment. Keeping the test chamber sealed may be important when the pollutant comprises, for example, an infectious or toxic agent. A sealed test chamber may prevent the infectious or toxic agent from leaking to the exterior of the test chamber. This may protect a user of the test apparatus, or anyone in the vicinity to the test apparatus, from being exposed to the infectious or toxic agent. One or more sealing elements may be employed to seal the panels relative to the frame. Any suitable sealing element may be employed. For example, synthetic rubber or fluoropolymer elastomers, such as Viton® fluoroelastomers (DuPont, Wilmington, Delaware, USA), strips or cords may be employed to seal the edges of the panels relative to the frame. Preferably, the sealing element is inert or any portion of the sealing element that may be in communication with the enclosed interior volume of the test chamber is inert.

The test chamber may be of any suitable shape. The one or more panels may be configured and arranged to achieve an appropriate shape of the test chamber. In some examples, the test chamber is cuboidal. Preferably, the enclosed interior volume and exterior shape of the test chamber is cuboidal.

The test chamber may be of any suitable size. In some examples, the enclosed interior volume of the test chamber is from 5 litres to 30 litres, such as from 10 litres to 20 litres.

The test chamber may be electrically grounded. Introduction of the test pollutant into the test chamber may result in a build-up of electrostatic charge. Electrostatic charge may result in the pollutant or a component of the pollutant being attached to interior surfaces of the test chamber. Electrically grounding the test chamber may reduce sorption of the pollutant or a component of the pollutant to the interior surfaces of the test chamber. Reducing sorption may increase the amount of pollutant that contacts the filter material of the test article. Thus, reducing sorption may allow for an accurate assessment of the test article under conditions in which the test article may be used.

Interior surfaces of the test chamber that may contact the test pollutant are preferably electrically conductive. Electrically conductive surfaces may make electrical grounding effective. If material forming structural elements of the test chamber are not electrically conductive, surfaces of the structural elements may be coated or treated with electrically conductive material. Examples of suitable electrically conductive materials include gold, silver, nickel, chrome, titanium, and platinum. In a preferred example, an interior surface of the test chamber that may contact a test pollutant comprises titanium.

Material forming the opening through which the test pollutant is introduced preferably is inert to the test material and is not susceptible to electrostatic charge build-up. In one example, the material forming the opening through which the test pollutant is introduced is formed of silicone coated with platinum. Material forming the outlet may be formed of silicone coated with platinum. The platinum may be electrically grounded.

The apparatus of the present invention may comprise any suitable support. The support may be configured to retain a test article. The support preferably retains the test article such that air within the test chamber flows through a filter medium of the test article prior to flowing through the outlet of the test chamber. The support may define a passageway in communication with the outlet of the test chamber. Air in the test chamber may flow through the passageway to the outlet. The support may be configured to retain the test article such that the filter medium is disposed in the passageway or disposed on an entrance of the passageway.

The support may extend into the enclosed interior space of the test chamber from a surface of the test chamber, such as from a surface of a panel. For example, the support may extend from the bottom of the test chamber, such as from a bottom panel of the test chamber. The support may comprise a housing extending from the bottom of the test chamber, such as a bottom panel of the test chamber. The housing may be mounted to the bottom of the test chamber, such as to the bottom panel of the test chamber, around the outlet of the test chamber. The housing may define the passageway.

The support may comprise one or more parts. In some examples, the support comprises the housing and an insert. The insert may be inserted into the housing from outside the test chamber through the outlet of the test chamber. The insert may engage the housing in any suitable manner. For example, the insert may engage the housing through thread engagement or through twist and lock engagement features. The housing and the insert may together define the passageway of the support.

The passageway of the support may be of any suitable shape and size. For example, the passageway may comprise a rectangular, triangular, circular, or oval cross-sectional shape. Preferably, the passageway comprises a circular cross-sectional shape. In some examples, the passageway has a circular or generally circular cross-sectional shape with a diameter in a range from 50 millimetres to 80 millimetres. For example, the passageway may have a circular or generally circular cross-sectional shape with a diameter in a range from 40 millimetres to 100 millimetres or from 30 millimetres to 120 millimetres.

The passageway of the support may be of any suitable length. In some examples, the passageway has a length in a range from 50 millimetres to 80 millimetres. For example, the passageway may have a length from 40 millimetres to 100 millimetres, or from 30 millimetres to 120 millimetres.

The cross-sectional shape, size, or shape and size of the passageway of the support may be uniform along the length of the passageway. The cross-sectional shape, size, or shape and size of the passageway may vary along the length of the passageway.

The passageway of the support may be configured to simulate airflow through a respiratory passageway of a human. For example, the passageway may have a shape and dimensions similar to one or more of a trachea, a larynx, an epiglottis, a pharynx, or oral cavity, a mouth, a nasal cavity, and a nostril.

The support may be configured to form more than one passageway in communication with the outlet of the test chamber. The support may be configured to retain the test article such that air that flows from the test chamber through the more than one passageway flows through the filter medium of the test article prior to flowing through the outlet.

The support may retain the test article in any suitable manner. The support may comprise a surface on which the test article may rest. The surface may have any suitable shape. For example, the surface may be flat or curved. The surface may be contoured in a manner to complement a surface of the test article. The surface of the support may be shaped to simulate a surface of a human face.

The support may comprise features configured to engage retention members of the test article. For example, if the test article comprises one or more straps, the support element may comprise detents, such as posts, configured to engage the straps. The support may comprise retention elements to retain the test article. For example, the support may comprise a clamp, a strap, a weighted member, or the like to retain the test article such that air that flow from the test chamber through the passageway passes through the filter medium of the test article.

In some examples, the support comprises a clamping element. The clamping element may apply force on the test article to press the test article against a surface of the support. The clamping element may comprise a clamping disc. The clamping element may be secured to a portion of the support in any suitable manner. In some examples, the clamping element is secured to a portion of the support by threaded members such as screws or bolts. In some examples, the clamping element is secured to the housing of the support by threaded members.

One or more sealing members may be placed between the test article and the support. For example, an O-ring or other suitable sealing element may be placed between the test article and the support.

The support may be formed from any suitable material or materials. For example, the support may comprise one or more of polymeric material, metallic material, ceramic material, and glass material. The support may be formed from one part or multiple parts. Preferably, the support is formed from materials that may withstand autoclaving.

The apparatus of the present invention may comprise any suitable introduction system. The introduction system may be configured to introduce any suitable test pollutant into the test chamber. For example, the test pollutant may comprise a chemical compound or complex, dust or other particles, or a biological material. A biological material may comprise pollen, spores, or pathogens. Pathogens may include bacteria and viruses. Preferably, the test pollutant comprises a biological material. More preferably, the test pollutant comprises a pathogen. Even more preferably, the test pollutant comprises a virus.

Preferably, the introduction system is configured to introduce the test pollutant in a manner similar to how a subject that may use the test article may be exposed to the test pollutant. For example, pathogens may be communicated from a first person to a second person by exposure to biological material that has been transported by fine droplets of mucus or saliva containing the biological material and emitted by the first person through respiration, coughing, or sneezing. The overall particle size distribution of suspensions of these fine droplets define their dynamics. The particle size distribution in the case of exhaled aerosols, such as from breathing, coughing, sneezing, and talking, range from sub-micron to sub-millimetre particle sizes.

Accordingly, the introduction system may be configured to introduce viruses and bacterial in fine droplets having a particle size distribution from 0.1 micrometres to 0.5 millimetres. In some examples, the introduction system is adapted to introduce viruses in particles having a size range from 0.1 micrometres to 0.1 millimetres.

The introduction system may introduce a test pollutant in any suitable form. Preferably, the form is similar to a form to which a subject that may use the test article may be exposed. For example, the introduction system may introduce test pollutants in liquid form or solid form. The introduction system may introduce the test pollutant as an aerosol. The aerosol may comprise fine liquid or solid particles. When the introduction system introduces bacteria or viruses, the introduction system is preferably configured to introduce the bacterial or viruses in fine liquid droplets.

The introduction system may comprise a source of pressurized gas or a device to generate air flow. The pressurized gas or air may flow through a source comprising the test pollutant. The flow of pressurized gas through the source may cause the test pollutant to be aerosolized into fine liquid or solid particles. In some examples, the introduction system comprises an aerosol generator. In some examples, the introduction system comprises a nebulizer. A nebulizer may introduce the test pollutant in the form of a fine mist.

The introduction system may introduce the test pollutants directly into the test chamber. The introduction system may introduce the test pollutants upstream of, or at an inlet in the test chamber. Preferably, the introduction system introduces the test pollutants directly into the test chamber. Regardless of where the introduction system introduces the test pollutants, the introduction system introduces the test pollutants such that the test pollutants may be entrained in air flowing from the inlet of the test chamber to the outlet of the test chamber.

The introduction system may be configured to introduce the test pollutant into the test chamber through an introduction opening on a surface of the test chamber. The surface provided with the introduction opening for introducing the test pollutant into the chamber is preferably an upper surface of the test chamber.

The apparatus may comprise one or more elements that facilitate flow of test pollutants entrained in air from the introduction opening to the passageway of the support, through a filter medium of a test article retained by the support.

The apparatus may comprise one or more elements that reduces loss of test pollutant to interior surfaces of the test chamber. For example, test pollutant may sorb to or deposit on the interior surfaces of the test chamber.

The apparatus may comprise a test pollutant inlet tube that may facilitate flow of test pollutants entrained in air from the introduction opening to the passageway of the support and may reduce loss of test pollutant to interior surfaces of the test chamber.

The apparatus may comprise a guide that may facilitate flow of test pollutants entrained in air from the introduction opening to the passageway of the support and may reduce loss of test pollutant to interior surfaces of the test chamber.

Preferably, the apparatus may comprise a test pollutant inlet tube and a guide. The combination of a test pollutant inlet tube and a guide may facilitate flow of test pollutants entrained in air from the introduction opening to the passageway of the support and reduce loss of test pollutant to interior surfaces of the test chamber.

The test pollutant inlet tube may surround the introduction opening and may extend into the test chamber. The test pollutant inlet tube may be integrally formed with the surface of the test chamber or may be a separate element that may be fixed relative to the surface of the test chamber in any suitable manner. For example, the test pollutant inlet tube may be fixed relative to the upper surface of the test chamber with a clamp.

The test pollutant inlet tube may have any suitable dimensions. The test pollutant inlet tube may define an inner diameter that is the same as or larger than the introduction opening. The test pollutant inlet tube may extend into the test chamber any suitable distance. For example, the test pollutant inlet tube may extend into the test chamber a distance from 2 centimetres to 15 centimetres, such as from 5 centimetres to 10 centimetres.

The test pollutant inlet tube may be made from any suitable material or materials. Preferably, the test pollutant inlet tube comprises an inert material. Preferably, any portion of the test pollutant inlet tube that may contact a test pollutant is inert. The test pollutant inlet tube, or portions of the test pollutant inlet tube, may be coated or treated to be inert. Preferably, a test pollutant contacting surface of the test pollutant inlet tube is hydrophobic. Examples of suitable materials for forming the bulk of the test pollutant inlet tube include glass, plastic, and metallic materials. Examples of suitable plastic materials include polycarbonate, polyetheretherketone (PEEK), polystyrene, poly(methyl methacrylate) (PMMA), poly(tetrafluoroethylene) and the like. Examples of suitable metal materials include aluminium, stainless steel, and the like. The materials may be inherently inert or may be treated or coated to be inert. Preferably, at least a portion of the test pollutant inlet tube is transparent. More preferably, the entire test pollutant inlet tube is transparent. For sterilization purposes the test pollutant inlet tube is preferably, resistant to one or more of temperatures up to 130° C.; organic solvents commonly present in sanitizing solutions such as ethanol or isopropanol; oxidative agents such as bleach or ozone; and UV irradiation.

The guide has an inner surface to direct air flow from the introduction opening towards the passageway. The guide extends from a first end to a second end. The first end of the guide may be in proximity to the introduction opening. "In proximity to" includes in contact with. The first end of the guide may be sealed relative to the test chamber surface around the introduction opening. For example, an O-ring or gasket may be placed between the first end of the guide and the test chamber surface with the introduction opening. When the apparatus is in an assembled configuration, the guide may be fixed relative to the test chamber surface around the introduction opening. The guide may be fixed relative to the surface in any suitable manner. For example, the guide may be fixed relative to the surface around the introduction opening with a clamp. The first end of the guide may define a first inner diameter that is greater than an outer diameter of the introduction opening at the introduction surface.

The second end of the guide may be in proximity to the passageway of the support. "In proximity to" includes being in contact with. The second end of the guide may define a second inner diameter that is larger than an outer diameter of the test article. The second end of the guide may be sealed relative to the support around the location of the test article. For example, an O-ring or gasket may be placed between the second end of the guide and a surface of the support. When the apparatus is in an assembled configuration, the guide may be fixed relative to the surface of the support. The guide may be fixed relative to the surface of the support in any suitable manner. For example, the guide may be fixed relative to the surface of the support with a clamp, through threaded engagement, or the like.

The guide may comprise interior surfaces defining a guide interior volume between the first and second ends. The guide interior surfaces may direct test aerosol entrained in air to flow from the introduction opening to the passageway of the support. The guide may have any suitable interior shape and dimensions. For example, the guide may be cylindrical.

The guide may include one or more air inlets. The air inlets may be beneficial when the guide is sealed relative to the test chamber surface and the surface of the support. The guide air inlets may place the interior volume of the guide in fluid communication with the inlet of the test chamber. Preferably, the one or more guide air inlets are in proximity to the first end of the guide. By being in proximity to the first end of the guide, the one or more guide air inlets may allow air from the inlet of the test chamber to flow into the interior chamber in proximity to a location at which the test pollutant is introduced. The air may mix with the test pollutant as the test pollutant flows through the guide towards the second end.

The guide air inlets may be arranged in any suitable manner. If the guide comprises more than one guide air inlet, the guide air inlets are preferably arranged in axial symmetry relative to a longitudinal axis of the guide. The guide air inlets may have any suitable dimensions. For example, the diameters of the guide air inlets may be from 0.2 centimetres to 3 centimetres, such as from 0.5 centimetres to 2 centimetres.

The guide may be formed from any suitable material or materials. Preferably, the guide comprises an inert material. Preferably, any portion of the guide that may contact a test pollutant is inert. The guide, or portions of the guide, may be coated or treated to be inert. Preferably, a test pollutant contacting surface of the guide is hydrophobic. Examples of suitable materials for forming the bulk of the guide include glass, plastic, and metallic materials. Examples of suitable plastic materials include polycarbonate, polyetheretherketone (PEEK), polystyrene, poly(methyl methacrylate) (PMMA), poly(tetrafluoroethylene) and the like. Examples of suitable metal materials include aluminium, stainless steel, and the like. The materials may be inherently inert or may be treated or coated to be inert. Preferably, at least a portion of the guide is transparent. More preferably, the entire guide is transparent. For sterilization purposes the guide is preferably, resistant to one or more of temperatures up to 130° C.; organic solvents commonly present in sanitizing solutions such as ethanol or isopropanol; oxidative agents such as bleach or ozone; and UV irradiation.

The guide may be electrically grounded. Electrical grounding may reduce build-up of electrostatic charge, which may reduce the amount of test pollutant, or a component of the test pollutant, from being retained by an interior surface of the guide. Interior surfaces of the guide that may contact the test pollutant are preferably electrically conductive. Electrically conductive surfaces may make electrical grounding effective. If material forming structural elements of the guide are not electrically conductive, surfaces of the structural elements may be coated or treated with electrically conductive material. Examples of suitable electrically conductive materials include gold, silver, nickel, chrome, titanium, and platinum.

The test pollutant inlet tube may be received in the guide in proximity to the first end of the guide. Accordingly, the inner diameter of the guide at the first end may be greater than an outer diameter of the test pollutant inlet tube. The test pollutant inlet tube may extend into the interior volume of the guide any suitable distance. If the guide includes one or more guide air inlets, the test pollutant inlet tube preferably extends into the interior volume of the guide, towards the second end of the guide, beyond the guide air inlets. As such, air entering the guide air inlets may flow along an exterior surface of the test pollutant inlet tube to facilitate more laminar, and less turbulent, flow of air through the guide. The laminar flow may form a sheath around the test pollutant entering the apparatus from the introducer opening. The sheath may at least partially persist along the length of the guide as the air flows towards the second end of the guide, which may reduce interaction of the test pollutant with the inner surface of the guide. This may result in reduction of test pollutant loss and may increase the mass of test pollutant available for testing.

If the guide includes more than one guide air inlet arranged in axial symmetry relative to the longitudinal axis of the guide, the radially symmetrical arrangement may increase homogeneity of test pollutant flow and may increase mixing of the test pollutant with the air, which may result in more temporally and spatially homogenous introduction of the test pollutant to the test article retained by the support.

Advantageously, the test pollutant inlet tube and the guide may address problems associated with aerosol loss that may be experienced in a test apparatus that does not include the test pollutant inlet tube and the guide. In the absence of the test pollutant inlet tube and the guide, air entering one or more inlet in one or more the test chamber wall may create turbulences. As the air mixes with the test pollutant, some of the test pollutant may be carried by the turbulent air to interior surfaces of the test chamber where test pollutant loss may occur. Such a loss may decrease the total test pollutant mass available for analysis and thereby may decrease experimental sensitivity. Moreover, the losses may be difficult to predict. Hence, the test pollutant mass that passes the test article may not be well characterized, and the filtration efficiency of the test article may not be able to be accurately calculated.

In addition to the turbulences that may result in test apparatuses that do not include the test pollutant inlet tube and the guide, uneven mixing of the test pollutant with dilution air may result. Therefore, the test pollutant may reach the test article in a temporally and spatially heterogeneous manner. This may result in local overloading of the test article with test pollutant, which may impact filtration efficiency of the test article, which may impact the experimental results.

These confounding factors may be reduced by the guide and the test pollutant inlet tube.

The apparatus for assessing the filter medium of the test article of the present invention may comprise any suitable air flow apparatus. The air flow apparatus is configured to draw air from within the test chamber through the passageway of the support and through the outlet of the test chamber. When a test article is retained by the support, the air will flow through the filter medium of the test article as the air flows from the test chamber to the passageway.

Any suitable air flow apparatus may be used to withdraw air from the test chamber through the outlet. For example, the air flow apparatus may comprise a negative pressure source relative to pressure in the test chamber or a device to generate a relative negative pressure to withdraw air from the chamber through the outlet. Examples of devices that may generate a relative negative pressure include a venturi pump, a fan, or any other suitable apparatus. Such devices are referred to herein as vacuum pumps.

The air flow apparatus may include a flow meter, a transducer to measure air pressure, or a flow meter and a transducer. The flow meter, transducer, or flow meter and transducer may be operably coupled to a controller. The controller may be coupled to the device that generates relative negative pressure. The controller may be adapted to regulate air flow through the test article based on input from the flow meter, transducer, or flow meter and transducer.

The air flow apparatus may be configured to introduce air through the outlet and the passageway of the support into the test chamber. When a test article is retained by the support, the air will flow through the filter medium of the test article as the air flows from the outlet and passageway to the test chamber. Any suitable air flow apparatus may be used to introduce air to the test chamber through the outlet. For example, the air flow apparatus may comprise a relative positive pressure source relative to pressure in the test chamber or a device to generate relative positive pressure to introduce air to the test chamber through the outlet. Examples of sources and devices that may generate a relative positive pressure include source of pressurized air, a fan, an air pump, or any other suitable apparatus to introduce air to the chamber through the outlet.

The air flow apparatus may comprise a piston pump, where movement of the piston in a first direction causes air to be withdrawn from the test chamber and movement of the piston in an opposite second direction causes air to be introduced into the test chamber. Piston pumps may advantageously provide physiologic volumes and movement of air.

The air flow apparatus may comprise a breathing machine, which may also be referred to as a mechanical ventilator.

The airflow apparatus may be coupled to the outlet of the test chamber or the passageway of the support in any suitable manner. For example, a conduit may be coupled to the air flow apparatus and the outlet or passageway of the support to carry air from the air flow apparatus to the outlet or the passageway from the outlet, or the passageway to the air flow apparatus.

The conduit may be coupled to a manifold to permit coupling to air flow apparatus configured to cause air to be withdrawn from the test chamber and to permit coupling to air flow apparatus configured to cause air to be introduced to the test camber.

The air flow apparatus may comprise one or more valves. For example, a first valve may be coupled to an apparatus configured to cause air to be withdrawn from the test chamber. A second valve may be coupled to an apparatus configured to cause air to be introduced to the test camber. The valves may be opened or closed at an appropriate time to allow air to flow into the test chamber or to allow air to be withdrawn from the test chamber. Valves may advantageously permit precise flow control.

A filter may be positioned in the conduit between the outlet and the air flow apparatus. The filter may protect the air flow apparatus from contaminants, such as pollutants, that may be present in the test chamber. The filter may protect the airflow apparatus from moisture in air flowing from the test chamber. The filter may also ensure that air from the air flow apparatus to the test chamber is clean without contamination, such as, pollutants. The filter may comprise a HEPA filter, a charcoal filter, or both a HEPA filter and a charcoal filter.

The apparatus for assessing a filter medium of a test article of the present invention may comprise a respiratory conditions simulation system. The respiratory conditions simulation system may simulate any suitable aspect of respiration, such as one or more, or all, of air flow volume, air flow rate, air flow duration, air flow periodicity, direction or air flow, temperature, humidity, carbon dioxide content, and pH. Preferably, the respiratory conditions simulation system simulates one or more aspect of human respiration.

The respiratory conditions simulation system may be operably coupled to the air flow apparatus. The respiratory conditions simulation system may comprise an air flow apparatus controller configured to cause the air flow apparatus to simulate one or more aspects of respiration of a subject that may use the test article. For example, the air flow apparatus controller may be configured to cause the airflow apparatus to simulate one or more of respiratory cycle periodicity, inhalation volume, inhalation rate, inhalation duration, exhalation volume, exhalation rate, and exhalation duration.

Preferably, the air flow apparatus controller is configured to cause the air flow apparatus to alternate between (i) drawing air from the test chamber through the passageway of the support and the outlet, and (ii) introducing air through the outlet and the passageway of the support into the test chamber.

The air flow apparatus controller may be configured to cause the air flow apparatus to withdraw any suitable volume of air from the test chamber through the outlet. The air flow apparatus controller may be configured to cause the air flow apparatus to withdraw a constant or variable volume of air from the test chamber through the outlet. The flow apparatus controller may be configured to cause the air flow apparatus to withdraw air from the test chamber through the outlet at any suitable rate. The air flow apparatus controller may be configured to cause the air flow apparatus to withdraw air from the test chamber through the outlet at a constant or variable rate. The air flow apparatus controller may be configured to cause the air flow apparatus to withdraw air from the test chamber through the outlet for any suitable duration.

For example, the air flow apparatus may be configured to cause from 0.2 litres to 6 litres preferably from 0.5 litres to 3 litres of air to be drawn from the test chamber through the passageway of the support and the outlet over a time period of from 0.5 second to 15 seconds, preferably from 1 second to 6 seconds. Such flow rates, flow volumes and durations simulate many of the conditions associated with human inhalation.

The air flow apparatus controller may be configured to cause the air flow apparatus to introduce any suitable volume of air to the test chamber through the outlet. The air flow apparatus controller may be configured to cause the air flow apparatus to introduce a constant or variable volume of air into the test chamber through the outlet. The flow apparatus controller may be configured to cause the air flow apparatus to introduce air into the test chamber through the outlet at any suitable rate. The air flow apparatus controller may be configured to cause the air flow apparatus to introduce air into the test chamber through the outlet at a constant or variable rate. The air flow apparatus controller may be configured to cause the air flow apparatus to introduce air into the test chamber through the outlet for any suitable duration.

For example, the air flow apparatus may be configured to cause from 0.2 litres to 6 litres, preferably from 0.5 litres to 3 litres, of air to be introduced to the test chamber through the passageway of the support and the outlet over a time period of from 0.5 second to 15 seconds, preferably from 1 second to 6 seconds. Such flow rates, flow volumes and durations simulate most conditions associated with human exhalation.

The air flow apparatus controller may be configured to control the air flow apparatus in any suitable manner. For example, the air flow apparatus controller may be operably coupled to a motor of a piston pump, if the air flow apparatus comprises a piston pump. The air flow apparatus controller may be operably coupled to a valve that regulates the rate of air flow from the air flow apparatus that is withdrawn from the test chamber, such as a vacuum pump. Alternatively or in addition, the air flow apparatus controller may be operably coupled to a motor of the air flow apparatus to withdraw air from the test chamber, such as the vacuum pump. As another example, the air flow apparatus may be operably coupled to a valve configured to regulate the rate of air flow from the air flow apparatus to the test chamber, such as a source of pressurized air.

The respiratory conditions simulation system may be configured to cause air of a predefined humidity to be introduced through the outlet of the test chamber, through the passageway of the support, and into the test chamber. If the test article is retained by the support, the air of the predefined humidity may flow through the filter medium of the test article.

The respiratory conditions simulation system may comprise a humidifier. The humidifier may be operably coupled to the air flow apparatus. The humidifier and the air flow apparatus, together, may be configured to cause air that is introduced through the outlet and the passageway of the support into the test chamber to have a regulated humidity.

The respiratory simulation system may comprise any suitable humidifier. For example, the humidifier may comprise a reservoir for retaining water. Air flowing from the air flow apparatus to the test chamber may flow across the water to add humidity to the air. The humidifier may have a wick to pull water from the reservoir. The air flowing from the air flow apparatus to the test chamber may increase in relative humidity as water from the wick may be transferred to the air as the air flow passes the wick. The air flow apparatus may comprise ultrasonic vibration apparatus or other suitable apparatus to enhance the transfer of water from the reservoir to the air as the air passes the reservoir. Ultrasonic vibration apparatus may comprise an element positioned in contact with water in the reservoir. When the element ultrasonically vibrates, water droplets may be formed. Air that passes across the water may contact the water droplets to increase the humidity of the air. The humidifier may comprise a heater to heat water in the reservoir. Heating the water may result in more moisture being included in the air that flows past the heated water. The humidifier may comprise an impeller that impacts the water to disperse water throughout air that flows past the reservoir.

Preferably, the humidity regulated air has a relative humidity similar to the relative humidity of air exhaled by a human. For example, the humidity regulated air may have a relative humidity in a range from 70 percent relative humidity to 100 percent relative humidity.

The respiratory conditions simulation system may comprise a respiratory humidity sensor and respiratory humidity controller operably coupled to the respiratory humidity sensor. The respiratory humidity sensor may be positioned at any suitable location downstream of the humidifier. In this context, downstream is relative to air flowing from the humidifier through the outlet, through the passageway of the support, and into the test chamber. For example, the humidity sensor may be positioned in a conduit through which the humidity regulated air flows towards the outlet of the test chamber or may be positioned in the passageway of the support. The respiratory humidity controller may be operably coupled to a component of the humidifier configured to control the amount of water transferred to air that flows through or past the humidifier. For example, the respiratory humidity controller may be operably coupled to an ultrasonic vibration apparatus. The ultrasonic vibration apparatus may comprise a piezoelectric element configured to ultrasonically vibrate when a current is applied. The respiratory humidity controller element may be configured to cause an appropriate current to be applied to the piezoelectric element.

The respiratory conditions simulation system may be configured to cause air in proximity to the test article to have a temperature that simulates temperature in proximity to a mouth or nose of a subject that may use the test article. The respiratory conditions simulation system may comprise a heating system. The heating system may be arranged and configured to cause air that is introduced by the air flow apparatus through the outlet and the passageway of the support into the test chamber to have a regulated temperature when in the passageway.

The respiratory conditions simulation system may comprise any suitable heating system. The heating system may comprise a heater and a water circulation system capable of circulating water heated by the heater. The water circulation system may comprise a pump to circulate the water. The heating system may comprise a thermally conductive element that transfers heat from the circulating heated water to air that flows from the air flow apparatus into the passageway of the support and into the test chamber. The heating system may be configured to heat the support.

The heating system may comprise a resistive element that may be heated to transfer heat to air flowing from the air flow apparatus through the passageway of the support and into the test chamber. Any suitable resistive element may be employed, such as a resistive wire, a resistive plate, a resistive grid, a resistive gel, and the like.

The heating system may be configured to heat by induction. For example, an inductive heating element may be used to heat water in a circulation system or to transfer heat to air flowing from the air flow apparatus through the passageway of the support and into the test chamber.

Components of the support or a conduit that carries air from the air flow apparatus to the conduit or the passageway of the support may be thermally conductive. For purposes of the present disclosure, a material is considered "thermally conductive" if the material has a thermal conductivity of 5 watts per meter kelvin [w/(m·K)] or greater, such as 10 w/(m·K) or greater or 50 w/(m·K) or greater. The components may be in thermal contact with thermally conductive elements of the heating system. Heat from the heating system may be transferred to air flowing from the air flow apparatus through the passageway of the support and into the test chamber.

The heating system may comprise a respiratory temperature sensor and a respiratory temperature controller operably coupled to the respiratory temperature sensor. The respiratory temperature controller may also be operably coupled to the heater, such as the resistive element or the water heater. The respiratory temperature sensor may be positioned at any suitable location. Preferably, the respiratory temperature sensor is positioned in, or in proximity to, the passageway of the support.

The heating system may be configured to cause air flowing through the passageway of the support in proximity of the test article to have any suitable temperature. For example, heating system may be configured to cause air that is introduced by the air flow apparatus through the outlet and the passageway into the test chamber to have a temperature in a range from 28 degrees Celsius to 45 degrees Celsius when in the passageway. Preferably, the air has a temperature in a range from 30 degrees Celsius to 42 degrees Celsius. More preferably, the air has a temperature in a range from 35 degrees Celsius to 40 degrees.

The heating system or components of the heating system may be included in the support that defines the passageway.

The respiratory conditions simulation system may be configured to cause air that flows from the outlet of the test chamber through the passageway of the support to have a carbon dioxide content similar to that of exhaled breath of a subject that may use the test article. If a test article is retained by the support, the carbon dioxide regulated air will flow through the filter medium of the test article.

The respiratory conditions simulation system may comprise a carbon dioxide concentration controller system. The carbon dioxide controller system may be configured to introduce carbon dioxide to air that is introduced through the outlet and the passageway of the support into the test chamber. The percentage of carbon dioxide in the air in the passageway may be regulated to a desired range.

The carbon dioxide controller system may comprise a source of pressurized carbon dioxide. The source of pressurized carbon dioxide may comprise a desired concentration of carbon dioxide. If the source of pressurized carbon dioxide comprises the desired concentration of carbon dioxide, the source of pressurized carbon dioxide may serve as a component of the air flow apparatus configured to introduce air into the test chamber.

The source of pressurized carbon dioxide may comprise a concentration of carbon dioxide greater than the desired carbon dioxide concentration. For example, the source may comprise carbon dioxide at concentration of 50 percent by volume or greater. The source may comprise carbon dioxide at concentration of up to 100 percent by volume. If the source of pressurized carbon dioxide comprises a concentration of carbon dioxide greater than the desired carbon dioxide concentration, carbon dioxide may be introduced from the source into air that flows from the air flow apparatus to the outlet of the test chamber and into the passageway of the support in any suitable manner. The carbon dioxide controller system may comprise a mixer to mix the carbon dioxide from the source and air from the air flow apparatus.

The carbon dioxide controller system may comprise a carbon dioxide sensor and a carbon dioxide controller operably coupled to the carbon dioxide sensor. The carbon dioxide controller may be operably coupled to a valve that controls the amount of carbon dioxide from the source that is introduced into the air. The carbon dioxide sensor may be positioned at any suitable location. Preferably, the carbon dioxide sensor is positioned in, or in proximity to, the passageway of the support.

The carbon dioxide controller system may be configured to cause air flowing through the passageway of the support in proximity to the test article to have any suitable carbon dioxide concentration. For example, the carbon dioxide controller system may be configured to cause air that is introduced by the air flow apparatus through the outlet and the passageway into the test chamber to have a carbon dioxide concentration in a range from 2 percent by volume to 7 percent by volume, preferably from 4 percent to 5 percent by volume.

The respiratory conditions simulation system may be configured to cause air that flows through the outlet of the test chamber through the passageway of the support (and thus through the filter medium of the test article) to have a pH similar to that of exhaled breath of a subject that may use the test article. For example, the respiratory conditions simulation system comprises a pH controller system. The pH controller system may comprise a pH controller apparatus configured to control the pH of air caused by the air flow apparatus to be introduced through the outlet and the passageway into the test chamber.

The pH controller system may comprise an acid pump coupled to a reservoir for containing an acid and configured to introduce the acid into air caused by the air flow apparatus to be introduced through the outlet and the passageway of the support into the test chamber. The acid pump may be adapted to deliver acid to a reservoir of a humidifier, such as a humidifier discussed above. The acid pump may pump acid from the acid reservoir into the humidifier reservoir to reduce the pH of the water in the humidifier. This may reduce the pH of air that contacts the reduced pH water.

The acid reservoir may contain any suitable solution comprising acid. For example, the solution may comprise citric acid.

The pH controller system may comprise a base pump coupled to a reservoir for containing a base and configured to introduce the base into air caused by the air flow apparatus to be introduced through the outlet and the passageway of the support into the test chamber. The base pump may be adapted to deliver base to a reservoir of a humidifier, such as a humidifier discussed above. The base pump may pump base from the base reservoir into the humidifier reservoir to increase the pH of the water in the humidifier. This may increase the pH of air that contacts the increased pH water.

The base reservoir may contain any suitable solution comprising base. For example, the solution may comprise sodium citrate solution.

The pH controller system may comprise a pH sensor and a pH controller operably coupled to the pH sensor. The pH controller may be operably coupled to the acid pump, the base pump, or the acid pump and the base pump. The pH sensor may be positioned at any suitable location. Preferably, the pH sensor is positioned in, or in proximity to, the passageway of the support.

The pH controller system may be configured to cause air flowing through the passageway of the support in proximity the test article to have any suitable pH. For example, the pH controller system may be configured to cause air that is introduced by the air flow apparatus through the outlet and the passageway into the test chamber to have a pH in a range from 8 to 8.3, preferably about 8.1 to 8.2.

The respiratory conditions simulation system may comprise a respiratory conditions simulation system controller that serves as or is operably coupled to one or more of the respiratory humidity controller, the respiratory temperature controller, the carbon dioxide controller, and the pH system controller. The respiratory conditions simulation system controller may be operably coupled to a user interface. The user interface may be used to set desired respiratory simulation condition to be employed while assessing the filter medium of the test article.

The apparatus for assessing a filter medium of a test article of the present invention may comprise any suitable external environment simulation system. The external environment simulation system may simulate any suitable aspect of an environment in which a user may employ the test article. For example, the external environment simulation system may be configured to regulate one or more, or all, of: temperature of air introduced into the test chamber, temperature of air in the test chamber, humidity of air introduced into the test chamber, humidity of air in the test chamber, environmental air pollutant concentration of air introduced into the test chamber, environmental air pollutant concentration of air in the test chamber, UV light introduced into the test chamber. The external environment simulation system may simulate an indoor environment or an outdoor environment.

The external environment simulation system may be configured to control the temperature of air introduced into the test chamber, the temperature of air in the test chamber, or both the temperature of air introduced into the test chamber and the temperature of air in the test chamber. The external environment simulation system may comprise an external temperature control system configured to cause temperature regulated air to enter the test chamber via the inlet. The external environment simulation system may comprise any suitable external temperature control system.

The external temperature control system may comprise an external system heater configured to heat ambient air such that air introduced into the test chamber has a temperature greater than ambient air, a cooler configured to cool ambient air such that air introduced into the test chamber has a temperature less than ambient air, or both a heater and a cooler.

The external temperature control system may comprise any suitable heater. The heater may comprise a resistive element, an inductive element, or the like. The heater may comprise a thermally conductive element that may transfer heat from the resistive element to air entering the test chamber through the inlet.

The external temperature control system may comprise any suitable cooler. The cooler may comprise a Peltier cooler, a refrigerant compressor, or the like. The cooler may comprise a thermally conductive element to which heat from air entering the test chamber through the inlet may be transferred.

The external temperature control system may comprise a water circulation system in which water of a temperature above or below ambient air is circulated. The external temperature control system may comprise a thermally conductive element that transfers heat from the circulating water to ambient air or transfers heat to the circulating water from ambient air.

The external temperature control system may comprise an external system temperature sensor and an external system temperature controller operably coupled to the external system temperature sensor. The external system temperature controller may also be operably coupled to the heater, the cooler, or the heater and the cooler. The external system temperature sensor may be positioned at any suitable location. Preferably, the external system temperature sensor is positioned to detect temperature in the test chamber.

The external temperature control system may be configured to cause air flowing through the inlet into the test chamber to have any suitable temperature. For example, if the external temperature control system is configured to simulate an outdoor environment, the external temperature control system may be configured to cause air flowing through the inlet into the test chamber to have a temperature in a range from −40 degrees Celsius to 45 degrees Celsius, preferably from 0 degrees Celsius to 30 degrees Celsius, more preferably from 10 degrees Celsius to 27 degrees Celsius. If the external temperature control system is configured to simulate an indoor environment, the external temperature control system may be configured to cause air flowing through the inlet into the test chamber to have a temperature in, for example, a range from 17 degrees Celsius to 26 degrees Celsius.

The external environment simulation system may be configured to control the humidity of air introduced into the test chamber, the humidity of air in the test chamber, or both the humidity of air introduced into the test chamber and the humidity of air in the test chamber. The external environment simulation system may comprise an external humidity control system configured to cause humidity-regulated air to enter the test chamber via the inlet. The external environment simulation system may comprise a humidifier, a dehumidifier, or both a humidifier and a dehumidifier positioned and adapted for increasing or decreasing relative humidity of air that enters the test chamber.

The external temperature control system may comprise an external system humidity sensor and an external system humidity controller operably coupled to the external system humidity sensor. The external system humidity controller may also be operably coupled to the humidifier, the dehumidifier, or the humidifier and the dehumidifier. The external system humidity sensor may be positioned at any suitable location. Preferably, the external system humidity sensor is positioned to detect humidity in the test chamber.

The external humidity control system may be configured to cause air flowing through the inlet into the test chamber to have any suitable humidity. For example, if the external humidity control system is configured to simulate an outdoor environment, the external humidity control system may be configured to cause air flowing through the inlet into the test chamber to have a relative humidity in a range from 20 percent to 90 percent, preferably from 50 percent to 70 percent. If the external humidity control system is configured to simulate an indoor environment, the external humidity control system may be configured to cause air flowing through the inlet into the test chamber to have a relative humidity in, for example, a range from 30 percent to 55 percent.

The external environment simulation may be configured to introduce ultraviolet (UV) light into the test chamber. For example, the external environment simulation system may comprise an ultraviolet light source configured to cause ultraviolet light to pass through an interior of the test chamber. The UV light source may be positioned in the interior of the test chamber or outside the test chamber. If the UV light source is outside the test chamber, the test chamber comprises a UV transparent portion that permits UV light from the light source to pass through the portion of the test chamber to the interior of the test chamber. The external environment simulation may be configured to control the intensity of the UV light source or the spectral output of the UV light source. By varying intensity of the UV light source, different times of a day, different times of a year, and different weather conditions may be simulated. Preferably, the UV source emits light having a spectrum similar to sunlight. For example, the UV source may emit light having a wavelength in a range from 300 nanometres to 400 nanometres. Sunlight emits 95 percent UV A rays, which are in a wavelength of 315 nanometres to 400 nanometres, and 5 percent UV B rays, which have a wavelength in a range from 280 nanometres to 315 nanometres. Preferably, the UV light source emits 95 percent UV A rays and 5 percent UV B rays.

The external environment simulation system may comprise a UV sensor, such as a photodiode, and a UV source controller operably coupled to the UV sensor. The UV source controller may control the intensity or spectral output at which the UV light source emits light signals based on input from the UV sensor. The UV sensor is preferably positioned to detect UV light within the test chamber.

The external environment simulation system may be configured to introduce an environmental air pollutant into the test chamber. The external environment simulation system may be configured to control the amount of the air pollutant in air introduced into the test chamber, the amount of the air pollutant in air in the test chamber, or both the amount of the air pollutant in air introduced into the test chamber and the amount of the air pollutant in air in the test chamber. The environmental air pollutant may be introduced into the test chamber in any suitable manner.

For example, the external environment simulation system may introduce environmental air pollutants in liquid form or solid form. The external environment simulation system may introduce the test pollutant as an aerosol. The aerosol may comprise fine liquid or solid particles. The external environment simulation system may comprise an external system aerosol generator positioned and configured to generate an aerosol comprising the environmental air pollutant such that the aerosol may be drawn into the test chamber through the inlet of the test chamber. The external system aerosol generator may comprise an external system nebulizer to introduce the environmental pollutant as a fine mist.

The external environment simulation system may comprise an antechamber into which the environmental pollutant is introduced. The antechamber may be in communication with the inlet of the test chamber such that air flows through the antechamber prior to flowing through the inlet. The environmental pollutant may be entrained in air that flows into the test chamber through the inlet.

The external environment simulation system may comprise a dilution valve operably coupled to the inlet. The dilution valve may be configured to introduce an environmental air pollutant into the test chamber through the inlet.

The external environment simulation system may comprise an environmental pollutant sensor and an environmental pollutant controller operably coupled to the environmental pollutant sensor. The environmental pollutant controller may be operably coupled to an environmental pollutant introducer, such as an external system aerosol generator, to control the amount of environmental pollutant produced and carried by air entering the inlet of the test chamber, based on input from the environmental pollutant sensor. The environmental pollutant controller may be operably coupled to the dilution valve to control the amount of pollutant carried in air entering the inlet of the test chamber based on input from the environmental pollutant sensor.

The external environment simulation system may be configured to introduce any suitable environmental pollutant into the system. Examples of environmental pollutants include particulate pollution, ozone, carbon monoxide, sulphur dioxide, nitrogen dioxide, lead, smoke, and smog.

The environment simulation system may comprise an environment system controller operably that serves as or is coupled to one or more of the external system temperature controller, external system humidity controller, UV source controller, and environmental pollutant controller. The environment system controller may be operably coupled to a user interface. The user interface may be used to set desired environment simulation condition to be employed while assessing the filter medium of the test article.

The apparatus for assessing the filter medium of the test article may comprise a main system controller. The main system controller may serve as or be operably coupled to one or more of the controllers of the respiratory simulation system, one or more of the controllers of the environment simulation system, or one or more of the controllers of the respiratory simulation system and one or more of the controllers of the environment simulation system. The main system controller may be operably coupled to a user interface. The user interface may be used to set one or more desired respiratory simulation system parameters, one or more desired environment simulation system parameters, or one or more desired respiratory simulation system parameters and desired environment simulation system parameters to be employed while assessing the filter medium of the test article.

The apparatus for assessing a filter medium of a test article of the present invention may include a test pollutant collector. The test pollutant collector may be positioned in an airflow path downstream of the test article. In this context, downstream is relative to air flowing from the test chamber through the passageway of the support and out the outlet of the test chamber. Preferably, the test pollutant collector is positioned such that air drawn from the test chamber through the passageway of support contacts the test pollutant collector.

The test pollutant collector may comprise material for collecting the test pollutant. The collection material may be retained in an apparatus for collecting the test pollutant. The collection material or collection apparatus may be impermeable to air or may be permeable to air. If the collection material and collection apparatus, which may be of the same material, are permeable to air, the permeable collection material preferably spans the passageway of the support. Accordingly, all the air that flows through the passageway may contact collection material.

If the collection material or collection apparatus are impermeable, air may flow around the collection material or collection apparatus after contacting the material or collection apparatus. The impermeable collection material or collection apparatus preferably does not span across the passageway of the support so that air may flow around the impermeable material or collection apparatus and continue to flow through the passageway downstream of the impermeable material or collection apparatus. Air within the passageway of the support may be directed towards the collection material so that all or substantially all the air that flows through the passageway from the test chamber contacts the collection material.

Preferably, air carrying the test pollutant impacts the collection material. A funnel element may be positioned in, or form a part of, the passageway of the support upstream of the surface of the collection material. In this context, upstream is relative to air flowing from the test chamber through the passageway of the support and out the outlet of the test chamber. Any suitable funnel element may be used. For example, the funnel element may comprise a cascade impactor ring. The funnel element may direct air flowing from the test chamber through the passageway of the support to collection material. The collection material that the air contacts or impacts may be positioned in the centre of the passageway.

The test pollutant collector and passageway of the support may be configured such that air may continue to flow through the passageway and out of the outlet of the test chamber after contacting or impacting the collection material or collection apparatus. In some examples, the test pollutant collector or the passageway comprises one or more apertures lateral to the impact surface of the test pollutant collector. The lateral apertures may permit air to flow around the surface of the collector and to continue to flow through the passageway and out of the outlet of the test chamber after impacting the surface of the test pollutant collector.

In some examples, the test pollutant collector comprises a cup and a holder configured to receive and retain the cup. The cup or a material disposed in the cup may comprise the surface that the air flowing through the passageway of the support contacts or impacts. The holder may comprise one or more apertures lateral to the location at which the cup is received. The one or more lateral apertures may be annular. The cup may be retained such that it is positioned in the passageway of the support and the one or more lateral apertures of the holder are in communication with the passageway.

The test pollutant collector may comprise any suitable material for collecting the test pollutant when air carrying the test pollutant contacts the test pollutant collector. For example, the test pollutant collector may comprise a hydrogel, a filter, or other material that may trap the test pollutant when air carrying the test pollutant contacts the test pollutant collector. A hydrogel may be particularly suitable for use when the test pollutant comprises a biological material such as a bacteria or a virus. The test pollutant collector may comprise any suitable hydrogel such as agarose, polyacrylamide, or alginate gel.

Hydrogels may preserve the viability of captured bacteria or viruses. Accordingly, test pollutant collectors or components of the test pollutant collectors that comprise hydrogels that have captured biological test pollutants such bacteria or viruses may be removed from the test apparatus. Once removed, properties of the captured bacteria or viruses may be evaluated outside of the test apparatus. For example, the number of collected pathogens or the viability or pathogenicity of a collected pathogen may be evaluated.

The test pollutant collector or portions of the test pollutant collector may, in some examples, be removed from the test apparatus without accessing the interior of the test chamber. For example, the test collector or components of the test collector may be removed through the outlet of the test chamber. In some examples, the test collector may be removed through the outlet of the test chamber with the test article is still retained by the support.

The support may comprise a housing disposed in the test chamber. The housing may be mounted to the test chamber around the outlet of the test chamber. The support may comprise an insert that may be inserted through the outlet of the test chamber to removably couple with the housing. The insert may be coupled to the housing in any suitable manner. For example, the insert may be coupled to the housing by thread engagement or by a twist and lock engagement features. The insert may be twisted in one direction to engage the housing or twisted in another direction to disengage from the housing. The insert may retain the test pollutant collector. The test pollutant collector may be removed from the insert after the insert is disengaged from the housing and withdrawn through the outlet of the test chamber.

The insert may comprise a handle that extends beyond an outer surface of the test chamber when the insert is fully engaged with the housing. The handle may be used to facilitate engagement and disengagement of the insert from the housing.

The ability to remove the test pollutant collector without accessing the interior of the test chamber may be advantageous when the test pollutant may be a hazardous agent. The ability to remove the test pollutant collector without accessing the interior of the test chamber may be particularly advantageous when the test pollutant may be an infectious agent, such as a bacteria or virus. Accordingly, a user of the test system may remove the test collector without being exposed to any hazardous or infectious agent that may be present in the test chamber.

Because the test pollutant collector may be removed and replaced, the system may be employed to study the effects of varying or various respiratory effects, environmental effects, or a combination of respiratory effects and environmental effects.

The material for collecting the test pollutant of the test collector may be removed and studied for any suitable purpose. For example, the mass of test pollutant collected may be determined. Aerosol dosimetry analysis may be performed. If the test pollutant is a pathogen, pathogenicity may be tested. For example, viability of the pathogen may be tested. If the pathogen infects a cell, such as a virus, the ability of the collected pathogen to infect a cell may be tested.

In some examples, the test pollutant collector comprises cultured cells. The cultured cells may simulate tissue. For example, the cultured cells may comprise lung epithelial cells cultured to simulate lung tissue. Such cultured cells systems may be particularly advantageous when the test pollutant comprises a respiratory virus, such as a SARS-CoV-2 virus, or another test pollutant known to affect lungs.

In some examples, the cultured cells may comprise skin cells, such as one or more of keratinocytes, skin epithelial cells, and the like.

In some examples, the test pollutant collector comprises a first cell or simulated tissue type and hepatocytes or simulated liver tissue. Preferably, the test pollutant collector comprises a simulated lung tissue and simulated liver tissues. By culturing cells or simulated tissue of a first type with hepatocytes or lung tissue, the effects of liver metabolism on the test pollutants may be evaluated. In particular, the effects of test pollutant metabolites on the first cell or tissue type may be evaluated.

The hepatocytes or simulated liver tissue and first cell or simulated tissue type may be in contact or may be separated. If the hepatocytes or simulated liver tissue are separated from the cultured first cell or simulated tissue type, the separated cells are preferably in fluid communication. In some examples, the test pollutant collector comprises a microfluidic circulation system that circulates fluid between the separated cells. The circulated fluids may provide for transfer of molecules and materials between the separated cells. The circulated fluids may provide nutrients to the cultured cells or simulated tissues and to remove waste products from the cultured cells or simulated tissue. The test pollutant collector may be positioned such that one or both cell types are initially exposed to the test pollutant by contact with air flowing through the passageway of the support.

A funnel element may be positioned in, or form a part or, the passageway of the support to direct air flowing through the passageway to the cultured cells. Prior to contacting the cultured cells, the airflow may be dispersed to prevent damage to the cells from the airflow. Any suitable air dispersion apparatus may be employed. For example, an inner diameter of the passageway may increase in a region upstream of the cultured cells. The increased inner diameter may serve to decelerate and disperse the air prior to contacting the cells.

In some examples, the cells are cultured on a permeable membrane. The air flowing through the passageway of the support may contact or impact the permeable membrane. Test pollutants that contact the permeable membrane may migrate through the membrane to contact the cells.

The apparatus for assessing a filter medium of a test article according to the present invention may be used to assess any suitable test article including any suitable filter medium. For example, test articles may comprise filters for heating, ventilation, and air conditioning (HVAC) equipment, occupational, environmental, and medical devices comprising a filter medium, and personal protective equipment comprising a filter medium. Preferably, the filter medium is employed in devices configured to be worn on or placed over a subject's mouth, nose, or mouth and nose. Such devices include masks and respirators.

A filter medium may prevent the passage of at least some test pollutant, may materially change the test pollutant, or may prevent the passage of at least some test pollutant and may materially change the test pollutant.

A filter medium that may materially change the test pollutant may be advantageous when the test pollutant comprises a toxic test pollutant, an infectious test pollutant, a pathogenic test pollutant or the like. Such filter medium may advantageously render the test pollutant non-toxic, non-infectious, non-pathogenic, and the like.

When the test apparatus of the present invention includes a test pollutant collector, the captured test pollutant may be evaluated for toxicity, infectiousness, pathogenicity, or the like. The effects of different respiratory conditions, external environment conditions, or respiratory conditions and external environment conditions on the toxicity, infectiousness, pathogenicity, and the like may also be tested with the test apparatus of the present invention.

The test apparatus of the present invention, in some examples, may be used without a test article comprising a filter medium. For example, the test apparatus may be used to study the effects of the test pollutant when no filter medium is present.

According to aspects of the present invention, there is provided an apparatus for assessing a filter medium of a test article. The apparatus comprises a test chamber, an introduction system, a support, an air flow apparatus, and a test pollutant collector. The test chamber, which may be as described above, comprises an inlet and an outlet. The introduction system, which may be as described above, is configured to introduce a test pollutant into the test chamber such that the test pollutant is entrained in air flowing from the inlet to the outlet. The support, which may be as described above, is configured to retain the test article. The support defines a passageway downstream of a location of the test article such that air flowing from the inlet to the outlet passes through the filter medium prior to entering the passageway. The test pollutant collector, which may be as described above, is positioned in an airflow path within the passageway such that air drawn from the test chamber through the passageway contacts the test pollutant collector. The air flow apparatus, which may be as described above, is configured to draw air from within the test chamber through the passageway and the outlet. The test pollutant preferably comprises a biological material. The biological material preferably comprises a pathogen. The pathogen preferably comprises a virus.

As used herein, the singular forms "a," "an," and "the" also encompass embodiments having plural referents, unless the content clearly dictates otherwise.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

As used herein, "providing," in the context of providing an apparatus or system, means manufacturing the apparatus or system, purchasing the apparatus or system, or otherwise obtaining the apparatus or system.

Any direction referred to herein, such as "top," "bottom," "left," "right," "upper," "lower," and other directions or orientations are described herein for clarity and brevity but are not intended to be limiting of an actual device or system. Devices and systems described herein may be used in a number of directions and orientations.

"Inert" means that the inert material does not substantially chemically or physically react with the component being tested, such as aerosol, and that the inert material does not substantially emit substances that may influence the test results by contaminating the component being tested. Equally, an inert material may not substantially sorb the component being tested.

"Sorption" refers to one or both of absorption and adsorption. Absorption is a phenomenon or process in which molecules are taken up in a bulk phase, which may be a liquid or solid material. Adsorption refers to the adhesion of molecules to a surface.

As used herein, a "hydrophobic" surface is a surface that exhibits water repelling properties. A surface may be considered hydrophobic if the surface exhibits a water contact angle of greater than 90 degrees. The "water contact angle" is the angle, conventionally measured through the liquid, where a liquid/vapour interface meets a solid surface. The water contact angle quantifies the wettability of a solid surface by a liquid via the Young equation. Contact angle may be measured by using a contact angle goniometer that employs a microscope objective to view the angle directly. The contact angle may be observed via the microscope objective and determined by viewing a drop of water deposited on the surface.

As used herein, a "controller" is one or more hardware devices, one or more software or firmware programs, or one or more hardware devices and software or firmware programs that manages or directs flow of data between two or more entities. The controller may include a memory, an Application-Specific Integrated Circuit (ASIC) state machine, a digital signal processor, a gate array, a microprocessor, or equivalent discrete or integrated logic circuitry. A controller may include memory that contains instructions that cause one or more components of the circuitry to carry out a function or aspect of the controller. Functions attributable to a controller in this disclosure may be embodied as one or more of software, firmware, and hardware. The controller may include a microprocessor.

Below there is provided a non-exhaustive list of non-limiting examples. Any one or more of the features of these examples may be combined with any one or more features of another example, embodiment, or aspect described herein.

Example Ex1 An apparatus for assessing a filter medium of a test article, comprising (i) a test chamber comprising an inlet and an outlet; (ii) an introduction system configured to introduce a test pollutant into the test chamber such that the test pollutant is entrained in air flowing from the inlet to the outlet; (iii) a support configured to retain the test article, wherein the support defines a passageway downstream of a location of the test article such that air flowing from the inlet to the outlet passes through the filter medium prior to entering the passageway; (iv) an air flow apparatus configured to draw air from within the test chamber through the passageway and the outlet; and (v) a respiratory conditions simulation system configured to simulate an aspect of respiration, an external environment simulation system configured to simulate an aspect of an external environment, or both the respiratory conditions simulation system and the external environment simulation system.

Example Ex2 The apparatus according to Example Ex1, wherein the introduction system is configured to introduce the test pollutant into the test chamber through an introduction opening on a surface of the test chamber.

Example Ex3 The apparatus according to Example Ex2, comprising a test pollutant inlet tube surrounding the introduction opening and extending into the test chamber.

Example Ex4 The apparatus according to Example Ex2 or Example Ex3, comprising a guide having an inner surface to direct air flow from the introduction opening towards the passageway, the guide extending from a first end to a second end.

Example Ex5 The apparatus according to Example Ex4, wherein the first end of the guide is in proximity to the introduction opening and the second end of the guide is in proximity to the passageway.

Example Ex6 The apparatus according to Example Ex4 or Ex5, wherein the first end of the guide is sealed relative to the introduction surface around the introduction opening.

Example Ex7 The apparatus according to Example Ex6, wherein the first end of the guide defines a first inner diameter, wherein the first inner diameter is greater than an outer diameter of the introduction opening at the introduction surface.

Example Ex8 The apparatus according to Example Ex6 or Ex7 comprising the test pollutant inlet tube of Example Ex3, wherein the first inner diameter is greater than an outer diameter of the test pollutant inlet tube.

Example Ex9 The apparatus according to any one of Examples Ex4 to Ex8, wherein the second end of the guide is sealed relative to the support around the location of the test article.

Example Ex10 The apparatus according to Example Ex 9, wherein the second end of the guide defines a second inner diameter, wherein the second inner diameter is larger than an outer diameter of the test article.

Example Ex11 The apparatus according to any one of Examples Ex4 to Ex10, wherein the guide defines a guide interior volume between the first and second ends.

Example Ex12 The apparatus according to Example Ex11 comprising the test pollutant inlet tube of Example Ex3, wherein the test pollutant inlet tube extends into the interior volume of the guide.

Example Ex13 The apparatus according to Example Ex10 or Ex11, wherein the guide is cylindrical.

Example Ex14 The apparatus according to any one of Example Ex11 to Ex13, wherein the guide comprises a first guide air inlet.

Example Ex15 The apparatus according to Example Ex14, wherein the first guide air inlet is in proximity to the first end of the guide.

Example Ex16 The apparatus according to Example Ex14 or Ex15, wherein the first guide air inlet places the guide interior volume in communication with the inlet of the test chamber.

Example Ex17 The apparatus according to any of Examples Ex14 to Ex16 comprising the test pollutant inlet tube of Example Ex3, wherein the test pollutant inlet tube extends into the interior volume of the guide, towards the second end of the guide, beyond the first guide air inlet.

Example Ex18 The apparatus according to any one of Examples Ex11 to Ex17, wherein the guide defines a second guide air inlet.

Example Ex19 The apparatus according to Example Ex18, wherein the first guide air inlet and the second guide air inlet are arranged in axial symmetry relative to a longitudinal axis of the guide.

Example Ex20 The apparatus according to Example Ex18 or Ex19, wherein the second guide air inlet places the guide interior volume in communication with the inlet of the test chamber.

Example Ex21 The apparatus according to any one of Examples Ex4 to Ex20, wherein the guide is electrically grounded.

Example Ex22 An apparatus according to any one of Examples Ex1 to Ex21, wherein the air flow apparatus is further configured to introduce air through the outlet and the passageway into the test chamber.

Example Ex23 An apparatus according to Example Ex22, wherein the respiratory conditions simulation system comprises an air flow apparatus controller operably coupled to the air flow apparatus, wherein the air flow apparatus controller is configured to cause the air flow apparatus to alternate between drawing air from the test chamber through the passageway and the outlet and introducing air through the outlet and the passageway into the test chamber.

Example Ex24 An apparatus according to Example Ex23, wherein the air flow apparatus controller is configured to cause the air flow apparatus to cause from 0.2 litres to 6 litres, preferably from 0.5 litres to 3 litres, of air to be drawn from the chamber through the passageway and the outlet over a time period of from 0.5 second to 15 seconds, preferably from 1 second to 6 seconds.

Example Ex25 An apparatus according to Example Ex23 or Ex24, wherein the air flow apparatus controller is configured to cause the air flow apparatus to cause from 0.2 litres to 6 litres, preferably from 0.5 litres to 3 litres, of air to be introduced through the outlet and passageway into the chamber over a time period of from 0.5 seconds to 15 seconds, preferably from 1 second to 6 seconds.

Example Ex26 An apparatus according to any one of Examples Ex21 to Ex25, wherein the air flow apparatus comprises a piston pump.

Example Ex27 An apparatus according to any one of Examples Ex23 to Ex25, wherein the air flow apparatus comprises: (i) a positive pressure pump and a first valve operably coupled to the positive pressure pump; (ii) a vacuum pump operably and a second valve operably coupled to the pump; and wherein the air flow apparatus controller is operably coupled to the first valve and to the second valve to cause the first and second valves to open and close to alternate between (a) air being drawn from the test chamber through the passageway and outlet, and (b) air being introduced through the outlet and the passageway into the test chamber.

Example Ex28 An apparatus according to any one of Examples Ex22 to Ex27, wherein the respiratory conditions simulation system comprises a humidifier operably coupled to the air flow apparatus and configured to cause air that is introduced through the outlet and the passageway into the test chamber to have a regulated humidity.

Example Ex29 An apparatus according to Example Ex28, wherein the respiratory conditions simulation system comprises a respiratory humidity sensor arranged and configured to detect relative humidity in the air caused by the air flow apparatus to be introduced through the outlet and the passageway into the test chamber.

Example Ex30 An apparatus according to Example Ex29, wherein the respiratory conditions simulation system comprises a respiratory humidity controller operably coupled to the respiratory humidity sensor and to the humidifier, wherein the respiratory humidity controller is configured to cause the humidifier to increase or decrease the relative humidity of the air that is introduced through the outlet and the passageway into the test chamber to maintain the regulated humidity based on input from the respiratory humidity sensor.

Example Ex31 An apparatus according to Example Ex29 or Ex30, wherein the regulated humidity is relative humidity in a range from 70 percent to 100 percent.

Example Ex32 An apparatus according to any one of Examples Ex22 to Ex31, wherein the respiratory conditions simulation system comprises a heating system arranged and configured to cause air that is introduced by the air flow apparatus through the outlet and the passageway into the test chamber to have a regulated temperature when in the passageway.

Example Ex33 An apparatus according to Example Ex 32, wherein the heating system is arranged and configured to cause air that is introduced by the air flow apparatus through the outlet and the passageway into the test chamber to have a temperature in a range from 28 degrees Celsius to 45 degrees Celsius when in the passageway, preferably from 30 degrees Celsius to 38 degrees Celsius.

Example Ex34 An apparatus according to Example Ex32 or Ex33, wherein the heating system is arranged and configured to heat at least a portion of the support that retains the test article to a temperature in a range from 35 degrees Celsius to 40 degrees Celsius, preferably from 36 degrees Celsius to 38 degrees Celsius.

Example Ex35 An apparatus according to any one of Examples Ex32 to Ex34, wherein the heating system comprises a heating element.

Example Ex36 An apparatus according to Example Ex35, wherein the heating system comprises a respiratory temperature sensor and a respiratory temperature controller, wherein the respiratory temperature controller is operably coupled to the respiratory temperature sensor and the heating element, wherein the respiratory temperature sensor is configured to cause the heating element to increase or decrease in temperature to maintain the regulated temperature based on input from the temperature sensor.

Example Ex37 An apparatus according to Example Ex35 or Example Ex36, wherein the heating element comprises a resistive element or an inductive heating element.

Example Ex38 An apparatus according to any one of Examples Ex32 to Ex37, wherein the heating system comprises a heating element configured to heat water and a pump for circulating the heated water.

Example Ex39 An apparatus according to any one of Examples Ex22 to Ex38, wherein the respiratory conditions simulation system comprises a carbon dioxide concentration controller system configured to introduce carbon dioxide to air that is introduced through the outlet and the passageway into the test chamber such that the percentage of carbon dioxide in the air in the passageway may be regulated to a desired range.

Example Ex40 An apparatus according to Example Ex39, wherein the desired range of the percentage of carbon dioxide in the air is 2% to 7% by volume, preferably from 4% to 5% by volume.

Example Ex41 An apparatus according to Example Ex39 or Ex40, wherein the carbon dioxide concentration controller system is configured to introduce carbon dioxide to the air that is introduced through the outlet and the passageway into the test chamber from a pressurized source of carbon dioxide having a concentration of carbon dioxide greater than the desired range.

Example Ex42 An apparatus according to Example Ex41, wherein the carbon dioxide concentration controller system comprises a carbon dioxide detector and a carbon dioxide controller operably coupled to the carbon dioxide detector and to a valve in communication with the source of carbon dioxide, wherein the carbon dioxide controller is configured to cause the valve to allow more or less of the carbon dioxide from the source to enter the air based on input from the carbon dioxide detector.

Example Ex43 The apparatus according to any one of Example Ex22 to Ex42, wherein the respiratory conditions simulation system comprises a pH controller system, wherein the pH controller system comprises a pH controller apparatus configured to control the pH of air caused by the air flow apparatus to be introduced through the outlet and the passageway into the test chamber.

Example Ex44 An apparatus according to Example Ex43, wherein the pH controller system is configured to cause the air to have a pH from 8.0 to 8.3, preferably from 8.1 to 8.2.

Example Ex45 An apparatus according to Example Ex43 or Ex44, wherein the pH controller system comprises an acid pump coupled to a reservoir for containing an acid and configured to introduce the acid into air caused by the air flow apparatus to be introduced through the outlet and the passageway into the test chamber.

Example Ex46 An apparatus according to Example Ex45, wherein the pH controller system comprises a pH sensor arranged and configured to detect pH in air caused by the air flow apparatus to be introduced through the outlet and the passageway into the test chamber; and a pH controller operably coupled to the pH sensor, wherein the pH controller is configured to cause the acid pump to increase or decrease the amount of acid added to the air based on input from the pH sensor.

Example Ex47 An apparatus according to Example Ex45 or Ex46 as they refer to any one of Examples Ex28 to Ex31, wherein the humidifier comprises a water source, and wherein the acid pump is configured to introduce an acid from the reservoir containing the acid to the water source.

Example Ex48 An apparatus according to any one of Example Ex43 to Ex47, wherein the pH controller system comprises a base pump coupled to a reservoir for containing a base and configured to introduce the base into air caused by the air flow apparatus to be introduced through the outlet and the passageway into the test chamber.

Example Ex49 An apparatus according to Example Ex48, wherein the pH controller system comprises a pH sensor arranged and configured to detect pH in air caused by the air flow apparatus to be introduced through the outlet and the passageway into the test chamber; and a pH controller operably coupled to the pH sensor, wherein the pH controller is configured to cause the base pump to increase or decrease the amount of base added to the air based on input from the pH sensor.

Example Ex50 An apparatus according to Example Ex48 or Ex49, wherein the humidifier comprises a water source, and wherein the base pump is configured to introduce a base from the reservoir containing the acid to the water source.

Example Ex51 An apparatus according to any one of Examples Ex1 to Ex50, wherein the apparatus comprises the external environment simulation system.

Example Ex52 An apparatus according to Example Ex51, wherein the external environment simulation system comprises an external temperature control system configured to cause temperature regulated air to enter the test chamber via the inlet.

Example Ex53 An apparatus according to Example Ex52, wherein the external temperature control system comprises a heater configured to heat ambient air such that air introduced into the test chamber has a temperature greater than ambient air.

Example Ex54 An apparatus according to Example Ex52 or Ex53, wherein the external temperature control system comprises a cooler configured to cool ambient air such that air introduced into the test chamber has a temperature less than ambient air.

Example Ex55 An apparatus according to any one of Examples Ex51 to Ex54, wherein the external temperature control system comprises an external system temperature sensor arranged and configured to detect the temperature of air in the test chamber, and an external system temperature controller operably coupled to the external system temperature sensor, wherein the external system temperature controller is configured to control the external system heater or cooler to modify the temperature of air in the test chamber based on input from the temperature sensor.

Example Ex56 An apparatus according to any one of Examples Ex51 to Ex55, wherein the external environment simulation system comprises an external humidity control system configured to cause humidity-regulated air to enter the test chamber via the inlet.

Example Ex57 An apparatus according to Example Ex56, wherein the external humidity control system comprises an external system humidity sensor arranged and configured to detect relative humidity in the air that enters the test chamber via the inlet.

Example Ex58 An apparatus according to Example Ex56 or Ex57, wherein the external humidity control system comprises an external system humidity sensor arranged and configured to detect relative humidity in the air in the test chamber.

Example Ex59 An apparatus according to any one of Examples Ex56 to Ex58, wherein the external humidity control system comprises a dehumidifier and is configured to introduce air into the test chamber having a lower relative humidity than ambient air.

Example Ex60 An apparatus according to Example Ex59 as it refers to Example Ex57 or Ex58, wherein the external humidity control system comprises an external system humidity controller operably coupled to the external system humidity sensor and to the dehumidifier, wherein the respiratory humidity controller is configured to regulate the dehumidifier based on input from the external system humidity sensor.

Example Ex61 An apparatus according to any one of Examples Ex56 to Ex60, wherein the humidity control apparatus comprises a humidifier and is configured to introduce air into the test chamber having a higher relative humidity than ambient air.

Example Ex62 An apparatus according to Example Ex61 as it refers to Example Ex57 or Ex68, wherein the external humidity control system comprises an external system humidity controller operably coupled to the external system humidity sensor and to the humidifier, wherein the respiratory humidity controller is configured to regulate the humidifier based on input from the external system humidity sensor.

Example Ex63 An apparatus according to any one of Examples Ex51 to Ex62, wherein the external environment simulation system comprises an ultraviolet light source configured to cause ultraviolet light to pass through an interior of the test chamber.

Example Ex64 An apparatus according to Example Ex63, wherein the ultraviolet light source is external to the test chamber.

Example Ex65 An apparatus according to Example Ex63, wherein the ultraviolet light source is within the interior of the test chamber.

Example Ex66 An apparatus according to any one of Examples Ex63 to Ex65, comprising an ultraviolet light sensor and an ultraviolet source controller operably coupled to the ultraviolet light sensor, wherein the ultraviolet source controller is operably coupled to the ultraviolet light source and configured to modify the intensity or spectral output of the light source based on input from the ultraviolet light sensor.

Example Ex67 An apparatus according to any one of Examples Ex51 to Ex66, wherein external environment simulation system is configured to introduce an environmental air pollutant into the test chamber Example Ex68 An apparatus according to Example Ex67, external environment simulation system comprises a dilution valve operably coupled to the inlet of the test chamber, wherein the dilution valve is configured to introduce the environmental air pollutant into the test chamber through the inlet.

Example Ex69 An apparatus according to Examples Ex67 or Ex68, wherein the external environmental system comprises an external system aerosol generator, wherein the external system aerosol generator is positioned and configured to generate an aerosol comprising the environmental air pollutant such that the aerosol may be drawn into the test chamber through the inlet.

Example Ex70 An apparatus according to Example Ex69, wherein the external system aerosol generator comprises an external system nebulizer.

Example Ex71 An apparatus according to any one of Examples Ex67 to Ex70, wherein the external environment simulation system comprises an environmental pollutant sensor and an environmental pollutant controller operably coupled to the environmental pollutant sensor, wherein the environmental pollutant controller is operably coupled to the external system aerosol generator according to Example Ex69 or Ex70, to the dilution valve of Example Ex67, or to both the external system aerosol generator according to Example Ex69 or Ex70 and the dilution valve of Example Ex67, to control the amount of the environmental air pollutant entering the test chamber through the inlet based on input from the environmental pollutant sensor.

Example Ex72 An apparatus according to any one of Examples Ex1 to Ex71, comprising a test pollutant collector positioned in an airflow path within the passageway such that air drawn from the test chamber through the passageway contacts the test pollutant collector.

Example Ex73 An apparatus according to Example Ex72, wherein the test pollutant collector comprises a collection material configured to trap the test pollutant.

Example Ex74 An apparatus according to Example Ex73, wherein the collection material configured to trap the test pollutant is permeable to air.

Example Ex75 An apparatus according to Example Ex74, wherein the collection material spans the passageway.

Example Ex76 An apparatus according to Example Ex73 or Ex74, wherein the collection material is disposed in or on a collection apparatus.

Example Ex77 An apparatus according to Example Ex76, wherein the collection apparatus is disposed in the passageway such that air may flow around the collection apparatus and continue to flow through the passageway and through the outlet.

Example Ex78 An apparatus according to Example Ex77, wherein the collection apparatus comprises a cup.

Example Ex79 An apparatus according to Example Ex78, wherein test pollutant collector further comprises a holder configured to receive the cup, wherein the holder comprises one or more apertures lateral to the position in which the cup is received.

Example Ex80 An apparatus according to any one of Examples Ex73 to Ex78, further comprising a funnel element positioned upstream of the collection material, wherein the funnel element directs air drawn through the passageway towards the collection material.

Example Ex81 An apparatus according to any one of Examples Ex73 to Ex80, wherein the collection material comprises a hydrogel.

Example Ex82 An apparatus according to any one of Examples Ex73 to Ex81, wherein the collection material comprises filter material.

Example Ex83 An apparatus according to any one of Examples Ex73 to Ex81, wherein the collection material comprises cultured cells.

Example Ex84 An apparatus according to Example Ex83, wherein the cultured cells simulate tissue.

Example Ex85 An apparatus according to Example Ex83 or Ex84, wherein the cultured cells comprise skin cells, lung cells, or lung cells and skin cells.

Example Ex86 An apparatus according to Example Ex85, where the cultured cells comprise lung cells.

Example Ex87 An apparatus according to Example Ex86, further comprising cultured liver cells.

Example Ex88 An apparatus according to Example Ex86, wherein the cultured liver cells are in contact with the cultured lung cells.

Example Ex89 An apparatus according to Example Ex86, wherein the cultured liver cells are separated from the cultured lung cells.

Example Ex90 An apparatus according to Example Ex89, further comprising a microfluidic circulation system that circulates fluid between the separated cells.

Example Ex91 An apparatus according to any one of Examples Ex1 to Ex90, wherein the introduction system is configured to introduce the test pollutant directly into the test chamber.

Example Ex92 An apparatus according to any one of Examples Ex1 to Ex91, wherein the introduction system comprises an aerosol generator.

Example Ex93 An apparatus according to Example Ex92, wherein the aerosol generator comprises a nebulizer.

Example Ex94 An apparatus according to any one of Examples Ex1 to Ex93, wherein the test chamber is electrically grounded.

Example Ex95 An apparatus according to any one of Examples Ex1 to Ex94, wherein the air flow apparatus comprises a vacuum pump configured to generate a negative pressure relative to pressure in the test chamber and to cause air to flow from the test chamber through the passageway and through the outlet.

Example Ex96 An apparatus according to Example Ex95, wherein the air flow apparatus comprises a valve configured to control flow of air from the test chamber towards the vacuum pump.

Example Ex97 An apparatus according to Example Ex96, wherein the air flow apparatus comprises a flow meter, a transducer to measure air pressure, or a flow meter and a transducer.

Example Ex98 An apparatus according to Example Ex97, wherein the air flow apparatus comprises a flow controller operably coupled to the flow meter, the transducer, or the flow meter and the transducer, wherein the flow controller is operably coupled to the vacuum pump to regulate air flow through the system based on input from the flow meter, transducer, or flow meter and transducer Example Ex99 An apparatus for assessing a filter medium of a test article, comprising: (i) a test chamber comprising an inlet and an outlet; ii) an introduction system configured to introduce a test pollutant into the test chamber such that the test pollutant is entrained in air flowing from the inlet to the outlet; (iii) a support configured to retain the test article, wherein the support defines a passageway downstream of a location of the test article such that air flowing from the inlet to the outlet passes through the filter medium prior to entering the passageway; (iv) an air flow apparatus configured to draw air from within the test chamber through the passageway and the outlet; and (v) a test pollutant collector positioned in an airflow path within the passageway such that air drawn from the test chamber through the passageway contacts the test pollutant collector.

Example Ex100 An apparatus according to Example Ex99, wherein the test pollutant collector is removable from the passageway without accessing the interior of the test chamber.

Example Ex101 An apparatus according to Example Ex100, wherein the support comprise a housing mounted to the test chamber about the outlet, wherein the support comprises an insert configured to engage and disengage from the housing, wherein the insert is insertable through the outlet, and wherein the insert retains the test pollutant collector.

Example Ex102 An apparatus according to any one of Examples Ex99 to Ex101, wherein the test pollutant collector comprises a collection material configured to trap the test pollutant.

Example Ex103 An apparatus according to Example Ex102, wherein the collection material configured to trap the test pollutant is permeable to air.

Example Ex104 An apparatus according to Example Ex103, wherein the collection material spans the passageway.

Example Ex105 An apparatus according to Example Ex102 or Ex103, wherein the test pollutant collector comprises a collection apparatus, wherein the collection material is disposed in or on a collection apparatus.

Example Ex106 An apparatus according to Example Ex105, wherein the collection apparatus is disposed in the passageway such that air may flow around the collection apparatus and continue to flow through the passageway and through the outlet.

Example Ex107 An apparatus according to Example Ex106, wherein the collection apparatus comprises a cup.

Example Ex108 An apparatus according to Example Ex107, wherein test pollutant collector further comprises a holder configured to receive the cup, wherein the holder comprises one or more apertures lateral to the position in which the cup is received.

Example Ex109 An apparatus according to any one of Examples Ex102 to Ex108, further comprising a funnel element positioned upstream of the collection material, wherein the funnel element directs air drawn through the passageway towards the collection material.

Example Ex110 An apparatus according to any one of Examples Ex102 to Ex109, wherein the collection material comprises a hydrogel.

Example Ex111 An apparatus according to any one of Examples Ex102 to Ex109, wherein the collection material comprises filter material.

Example Ex112 An apparatus according to any one of Examples Ex102 to Ex109, wherein the collection material comprises cultured cells.

Example Ex113 An apparatus according to Example Ex112, wherein the cultured cells simulate tissue.

Example Ex114 An apparatus according to Example Ex112 or Ex113, wherein the cultured cells comprise skin cells, lung cells, or lung cells and skin cells.

Example Ex115 An apparatus according to Example Ex114, where the cultured cells comprise lung cells.

Example Ex116 An apparatus according to Example Ex115, further comprising cultured liver cells.

Example Ex117 An apparatus according to Example Ex115, wherein the cultured liver cells are in contact with the cultured lung cells.

Example Ex118 An apparatus according to Example Ex115, wherein the cultured liver cells are separated from the cultured lung cells.

Example Ex119 An apparatus according to Example Ex118, further comprising a microfluidic circulation system that circulates fluid between the separated cells.

Example Ex120 An apparatus according to any one of Examples Ex99 to Ex119, wherein the introduction system is configured to introduce the test pollutant directly into the test chamber.

Example Ex121 An apparatus according to any one of Examples Ex99 to Ex120, wherein the introduction system comprises an aerosol generator.

Example Ex122 An apparatus according to Example Ex121, wherein the aerosol generator comprises a nebulizer.

Example Ex123 An apparatus according to any one of Examples Ex99 to Ex122, wherein the test chamber is electrically grounded.

Example Ex124 An apparatus according to any one of Examples Ex99 to Ex123, wherein the air flow apparatus comprises a vacuum pump configured to generate a negative pressure relative to pressure in the test chamber and to cause air to flow from the test chamber through the passageway and through the outlet.

Example Ex125 An apparatus according to Example Ex124, wherein the air flow apparatus comprises a valve configured to control flow of air from the test chamber towards the vacuum pump.

Example Ex126 An apparatus according to Example Ex125, wherein the air flow apparatus comprises a flow meter, a transducer to measure air pressure, or a flow meter and a transducer.

Example Ex127 An apparatus according to Example Ex126, wherein the air flow apparatus comprises a flow controller operably coupled to the flow meter, the transducer, or the flow meter and the transducer, wherein the flow controller is operably coupled to the vacuum pump to regulate air flow through the system based on input from the flow meter, transducer, or flow meter and transducer.

Example Ex128 A method for assessing a filter medium of a test article, comprising: (i) positioning the test article in a test chamber comprising an inlet and an outlet such that air that flows from the inlet to the outlet flows through the filter medium of the test article and air that flows from the outlet to the inlet flows through the filter medium of the test article; (ii) introducing a test pollutant into the test chamber such that the test pollutant is entrained in air that flows from the inlet to the outlet; (iii) causing air to flow from the test chamber through the filter medium and through the outlet; and (iv) a simulating an aspect of respiration, simulating an aspect of an external environment, or simulating the aspect of respiration and the aspect of an external environment.

Example Ex129 A method according to Example Ex128, wherein simulating an aspect of respiration comprises causing air to flow from the test chamber through the filter medium and through the outlet at a rate, volume, or duration, or periodicity of human inhalation.

Example Ex130 A method according to Example Ex129, wherein from 0.2 litres to 6 litres, preferably from 0.5 litres to 3 litres, of air is caused to flow from the test chamber through the filter medium and through the outlet over a time period of from 0.5 second to 15 seconds, preferably from 1 second to 6 seconds.

Example Ex131 A method according to Example Ex129 or Ex130, comprising monitoring rate of flow of air from the test chamber through the filter medium and to the outlet, and adjusting flow rate to maintain a desired rate.

Example Ex132 A method according to any one of Examples Ex128 to Ex131, wherein simulating an aspect of respiration comprises causing air to flow from the outlet through the filter medium and into the test chamber.

Example Ex133 A method according to Example Ex132, wherein simulating an aspect of respiration comprises causing the air to alternate between flowing from the test chamber through the filter medium and through the outlet and flowing from the outlet through the filter medium and into the test chamber.

Example Ex134 A method according to Example Ex132 or Ex133, wherein simulating an aspect of respiration comprises causing air to flow from the outlet through the filter medium and into the test chamber at a rate, volume, duration, or periodicity of human inhalation.

Example Ex135 A method according to Example Ex134, wherein from 0.2 litres to 6 litres, preferably from 0.5 litres to 3 litres, of air is caused to flow from the outlet through the filter medium and into the test chamber over a time period of from 0.5 second to 15 seconds, preferably from 1 second to 6 seconds.

Example Ex136 A method according to any one of Examples Ex132 to Ex135, comprising monitoring rate of flow of air from the outlet through the filter medium and into the test chamber, and adjusting flow rate to maintain a desired rate.

Example Ex137 A method according to any one of Examples Ex132 to Ex136, wherein simulating an aspect of respiration comprises causing air that flows from the outlet through the filter medium and into the test chamber to have a regulated humidity.

Example Ex138 A method according to Example Ex137, comprising monitoring relative humidity of air flowing from the outlet through the filter medium and into the test chamber, and adjusting relative humidity of the air to maintain the regulated humidity.

Example Ex139 A method according to Example Ex137 or Ex138, wherein simulating an aspect of respiration comprises causing air that flows from the outlet through the filter medium and into the test chamber to have a relative humidity in a range from 70 percent to 100 percent.

Example Ex140 A method according to any one of Examples Ex132 to Ex139 wherein simulating an aspect of respiration comprises causing air that flows from the outlet through the filter medium and into the test chamber to have a regulated temperature.

Example Ex141 A method according to Example Ex140, comprising monitoring temperature of air from the outlet through the filter medium and into the test chamber, and adjusting the temperature of the air to maintain the regulated temperature.

Example Ex142 A method according to Example Ex140 or Ex141, wherein simulating an aspect of respiration comprises causing air that flows from the outlet through the filter medium and into the test chamber to have a temperature in a range from 28 degrees Celsius to 40 degrees Celsius when in the passageway, preferably from 30 degrees Celsius to 38 degrees Celsius.

Example Ex143 A method according to any one of Examples Ex132 to Ex142, wherein simulating an aspect of respiration comprises causing air that flows from the outlet through the filter medium and into the test chamber to have a regulated carbon dioxide concentration.

Example Ex144 A method according to Example Ex143, comprising monitoring carbon dioxide concentration of air from the outlet through the filter medium and into the test chamber, and adjusting the carbon dioxide concentration of the air to maintain the regulated carbon dioxide concentration.

Example Ex145 A method according to Example Ex143 or Ex144, wherein simulating an aspect of respiration comprises causing air that flows from the outlet through the filter medium and into the test chamber to have a carbon dioxide concentration of 2% to 7% by volume, preferably from 4% to 5% by volume.

Example Ex146 A method according to any one of Examples Ex132 to Ex145, wherein simulating an aspect of respiration comprises causing air that flows from the outlet through the filter medium and into the test chamber to have a regulated pH.

Example Ex147 A method according to Example Ex146, comprising monitoring pH of air from the outlet through the filter medium and into the test chamber, and adjusting the pH of the air to maintain the regulated pH.

Example Ex148 A method according to Example Ex146 or Ex147, wherein simulating an aspect of respiration comprises causing air that flows from the outlet through the filter medium and into the test chamber to have a pH from 8.0 to 8.3, preferably from 8.1 to 8.2.

Example Ex149 A method according to any one of Examples Ex128 to Ex148, wherein simulating an aspect of the external environment comprises causing temperature regulated air to enter the test chamber through the inlet.

Example Ex150 A method according to Example Ex149, comprising monitoring temperature of air entering the test chamber through the inlet, and adjusting the temperature of the air to maintain the regulated temperature.

Example Ex151 A method according to Example Ex150, wherein adjusting the temperature of the air comprises heating the air or cooling the air.

Example Ex152 A method according to any one of Examples Ex108 to Ex131, wherein simulating an aspect of the external environment comprises causing air that flows from the outlet through the filter medium and into the test chamber to have a regulated humidity.

Example Ex153 A method according to Example Ex152, comprising monitoring relative humidity of air from the outlet through the filter medium and into the test chamber, and adjusting the relative humidity of the air to maintain the regulated humidity.

Example Ex154 A method according to Example Ex153, wherein adjusting the relative humidity of the air comprises increasing the relative humidity of the air or decreasing the relative humidity of the air.

Example Ex155 A method according to any one of Examples Ex128 to Ex154, wherein simulating an aspect of the external environment comprises causing ultraviolet light to pass through an interior of the test chamber.

Example Ex156 A method according to Example Ex155, comprising monitoring the intensity, spectral output, or intensity and spectral output of the ultraviolet light in the test chamber, and adjusting the intensity, spectral output, or intensity and spectral output to maintain a desired intensity, spectral output, or intensity and spectral output.

Example Ex157 A method according to any one of Examples Ex128 to Ex156, wherein simulating an aspect of the external environment comprises introducing an environmental air pollutant into the test chamber.

Example Ex158 A method according to Example Ex157, comprising monitoring the concentration of the environmental air pollutant introduced into the chamber, and adjusting the amount of environmental air pollutant introduced into the chamber to maintain a desired concentration of environmental air pollutant.

Example Ex159 A method according to any one of Examples Ex128 to Ex158, comprising collecting the test pollutant after air from the test chamber has passed through the filter medium.

Example Ex160 A method according to Example Ex159, comprising determining the amount of test pollutant collected.

Example Ex161 A method according to Example Ex159 or Ex160, wherein the test pollutant comprises a pathogen.

Example Ex162 A method according to Example Ex161, comprising determining the viability of the pathogen.

Example Ex163 A method according to Example Ex162, comprising determining the pathogenicity of the pathogen.

Example Ex164 A method according to any one of Examples Ex128 to Ex163, comprising contacting air that has flown from the test chamber past the filter medium with cultured cells.

Example Ex165 A method according to Example Ex164, wherein the cultured cells simulate tissue.

Example Ex166 A method according to Example Ex164 or Ex165, wherein the cultured cells comprise skin cells, lung cells, or lung cells and skin cells.

Example Ex167 A method according to Example Ex166, where the cultured cells comprise lung cells.

Example Ex168 A method according to Example Ex167, further comprising cultured liver cells.

Example Ex169 A method according to Example Ex167, wherein the cultured liver cells are in contact with the cultured lung cells.

Example Ex170 An apparatus according to Example Ex167, wherein the cultured liver cells are separated from the cultured lung cells.

Example Ex171 A method according to Example Ex170, further comprising circulating fluid between the separated cells.

Example Ex172 A method according to any one of Examples Ex128 to Ex171, wherein introducing the test pollutant into the test chamber comprises introducing the test pollutant into the chamber as an aerosol.

Example Ex173 A method according to Example Ex172, wherein the aerosol comprises a mist.

Example Ex174 A method for assessing a filter medium of a test article, comprising: (i) positioning the test article in a test chamber comprising an inlet and an outlet such that air that flows from the inlet to the outlet flows through the filter medium of the test article and air that flows from the outlet to the inlet flows through the filter medium of the test article; (ii) introducing a test pollutant into the test chamber such that the test pollutant is entrained in air that flows from the inlet to the outlet; (iii) causing air to flow from the test chamber through the filter medium and through the outlet; and (iv) collecting the test pollutant after air from the test chamber has passed through the filter medium.

Example Ex175 A method according to Example Ex174, comprising determining the amount of test pollutant collected.

Example Ex176 A method according to Example Ex174 or Ex175, wherein the test pollutant comprises a pathogen.

Example Ex177 A method according to Example Ex176, comprising determining the viability of the pathogen.

Example Ex178 A method according to Example Ex177, comprising determining the pathogenicity of the pathogen.

Example Ex179 A method according to any one of Examples Ex174 to Ex178, comprising contacting air that has flown from the test chamber past the filter medium with cultured cells.

Example Ex180 A method according to Example Ex179, wherein the cultured cells simulate tissue.

Example Ex181 A method according to Example Ex179 or Ex180, wherein the cultured cells comprise skin cells, lung cells, or lung cells and skin cells.

Example Ex182 A method according to Example Ex181, where the cultured cells comprise lung cells.

Example Ex183 A method according to Example Ex182, further comprising cultured liver cells.

Example Ex184 A method according to Example Ex183, wherein the cultured liver cells are in contact with the cultured lung cells.

Example Ex185 An apparatus according to Example Ex183, wherein the cultured liver cells are separated from the cultured lung cells.

Example Ex186 A method according to Example Ex185, further comprising circulating fluid between the separated cells.

Example Ex187 A method according to any one of Examples Ex174 to Ex186, wherein introducing the test pollutant into the test chamber comprises introducing the test pollutant into the chamber as an aerosol.

Example Ex188 A method according to Example Ex187, wherein the aerosol comprises a mist.

Examples will now be further described with reference to the figures in which.

Figure 1:
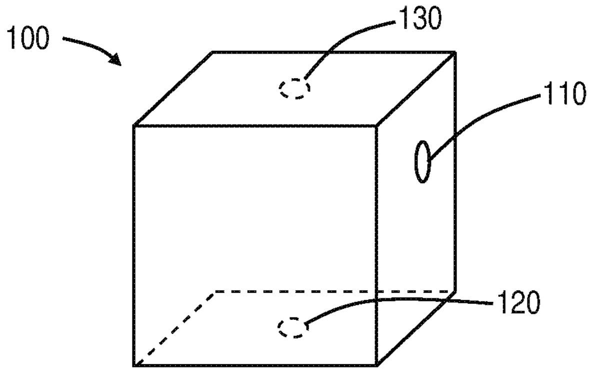
FIG. 1 is schematic perspective view of a test chamber.

FIG. 1 illustrates an example of a test chamber 100. The test chamber comprises an inlet 110, an outlet 120, and an introduction opening 130. When the outlet is coupled to a negative pressure source or pump, air may flow through the inlet into the test chamber 100. A device for introducing an aerosol may be operably coupled to introduction opening 130 to introduce the aerosol into the test chamber. The introduced aerosol may be entrained in air that flows from the inlet 110 through the test chamber 100 through the outlet 120.

Figure 2:
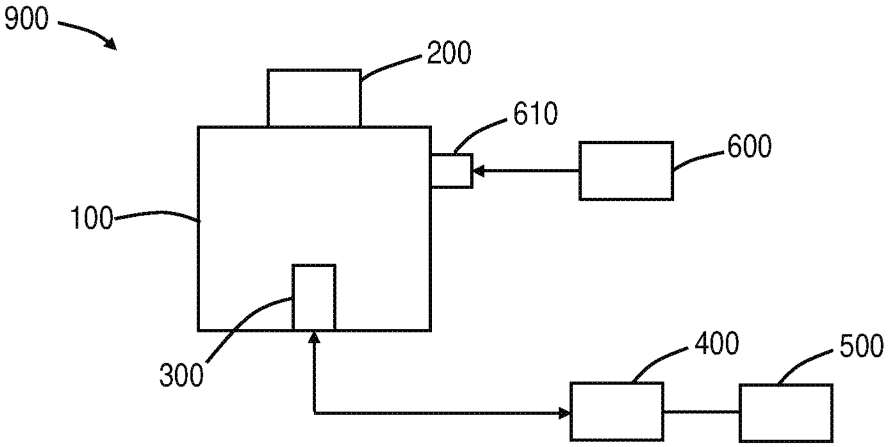
FIG. 2 is a block diagram of an apparatus for assessing a filter medium of a test article.

FIG. 2 illustrates an example of an apparatus 900 for assessing a filter medium of a test article. The apparatus 900 comprises a test chamber 100, such as the test chamber 100 of FIG. 1; an introduction system 200, a support 300, an air flow apparatus 400, a respiratory conditions simulation system 500, and an external environment simulation system 600. The introduction system 200 includes an aerosol generator mounted on the test chamber 100 and configured to introduce an aerosol comprising a test pollutant into the test chamber 100. The support 300 is configured to define a passageway in communication with the interior of the test chamber 100 and the outlet of the test chamber (such as outlet 120 depicted in FIG. 1). The support 300 is configured to retain the test article such that air that passes from the test chamber 100 through the passageway and outlet passes through the filter media of the test article.

The air flow apparatus 400 is configured to draw air from the test chamber 100 through the passageway of the support 300 and the outlet, and to force air through the outlet of the test chamber 100, the passageway of the support 300, and into the test chamber 100. The test chamber 100 may comprise a filtered vent (not shown) to allow air forced into the test chamber 100 from the air flow apparatus 400 to escape the interior of the test chamber 100.

The respiratory conditions simulation system 500 may control, work cooperatively with, or control and work cooperatively with the air flow apparatus 400 to simulation one or more aspect of respiration, such as rate, volume, duration, and periodicity of air flow, humidity, temperature, pH, and carbon dioxide concentration.

The environment simulation system 600, or components of the environment simulation system 600, may be operably coupled to the inlet to control the content of air that enters the inlet (such as inlet 110 of FIG. 1) of the test chamber 100. The environment simulation system 600 comprises a valve 610 operably coupled to the inlet of the test chamber. The valve 610 may be a check valve that allows air to flow from outside the test chamber 100 to the interior of the test chamber 100 but prevent air from flowing from inside the test chamber 100 to the exterior of the test chamber 100. The valve 610 may be a dilution valve to introduce controlled amounts of environmental air pollutants into the test chamber 100.

Figure 3:
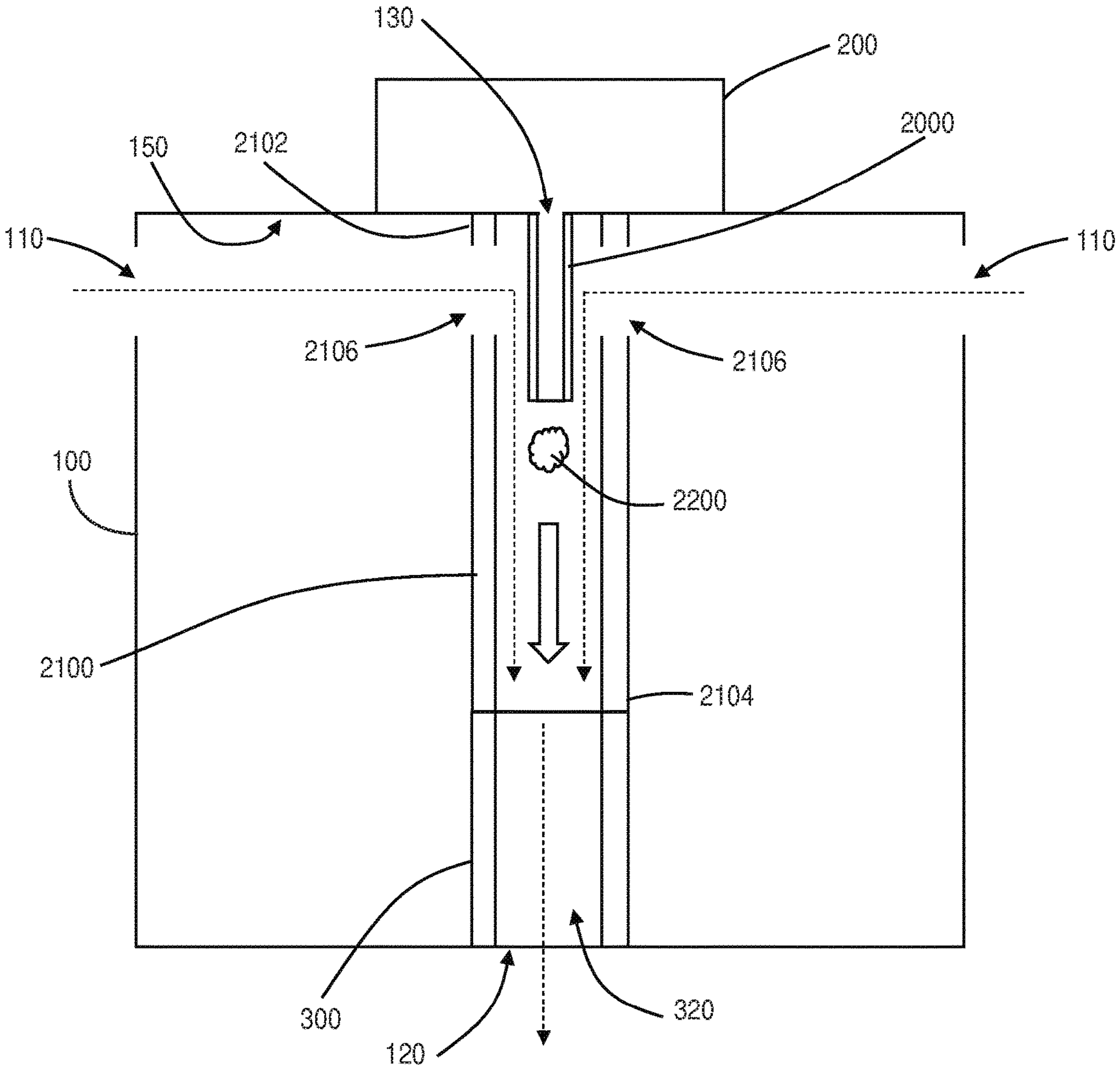
FIG. 3 is a schematic sectional view of an apparatus having a test pollutant inlet tube and guide.
Figure 4:
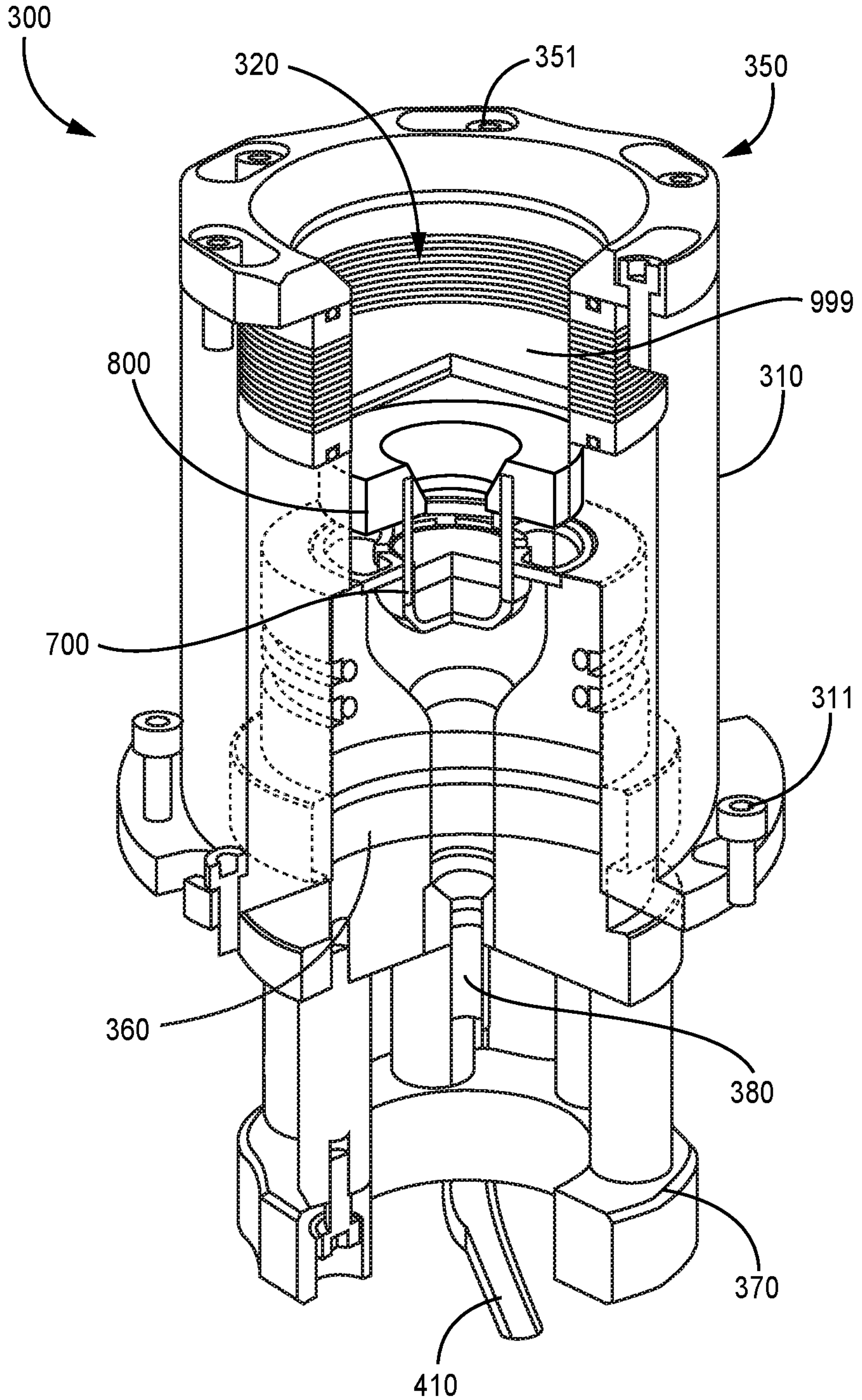
FIG. 4 is a schematic cut away view of a support and test pollutant collector.
Figure 5:
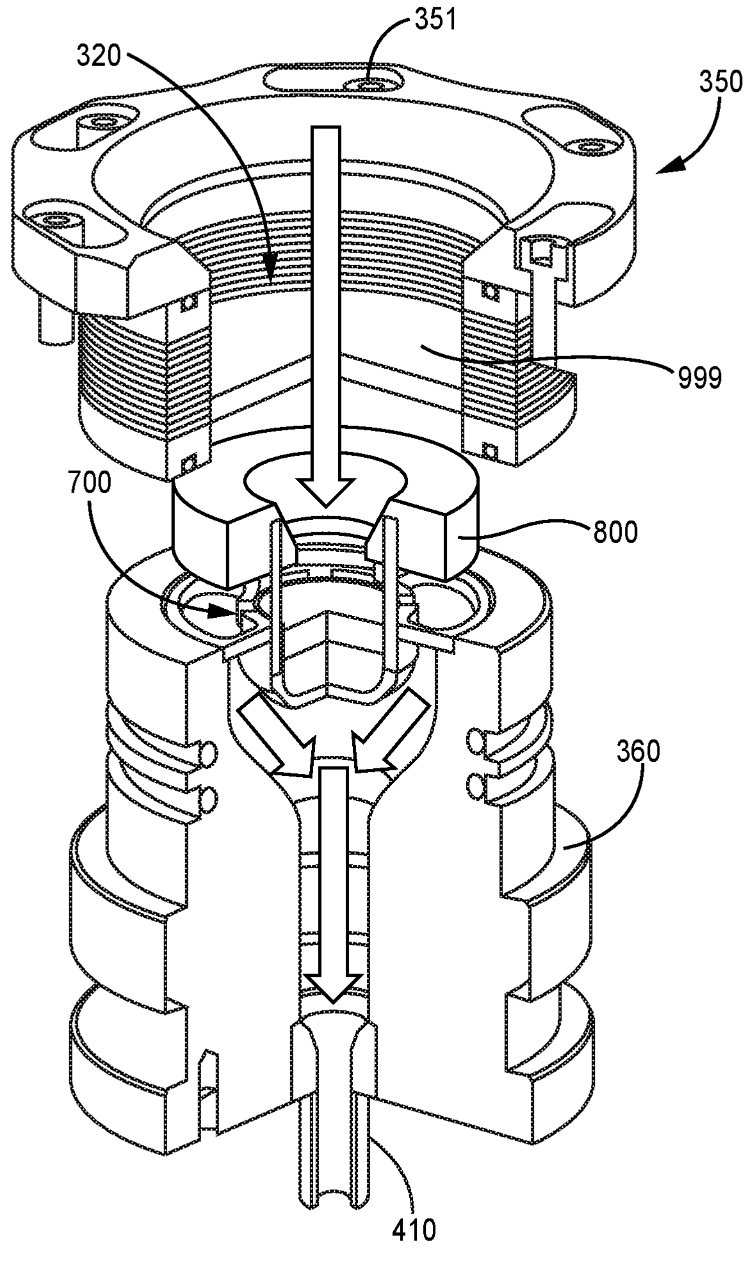
FIG. 5 is a schematic cut away view of a support and test pollutant collector, showing some components illustrated in FIG. 4.
Figure 6:
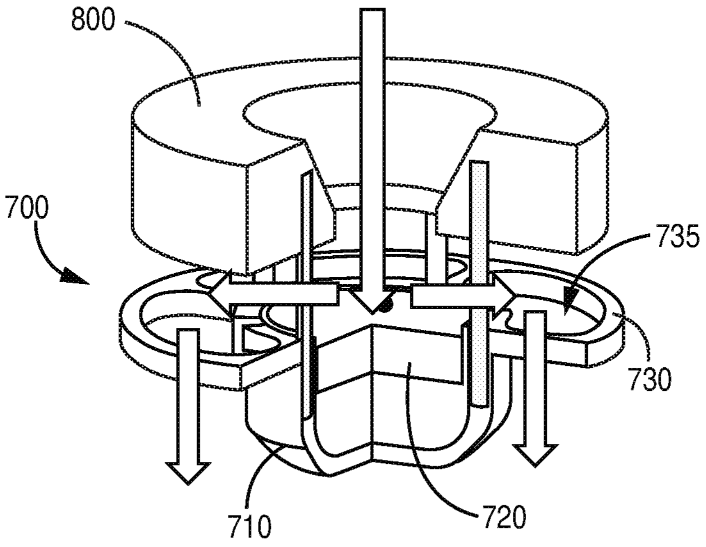
FIG. 6 is a schematic cut away view of a test pollutant collector.
Figure 7:
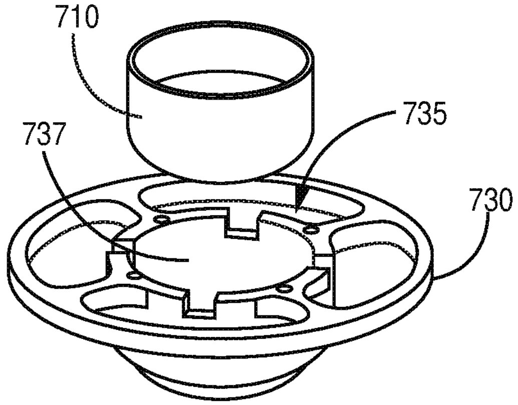
FIG. 7 is a schematic perspective view of a test pollutant collector.

FIG. 3 illustrates an example of some components of an apparatus having a test pollutant inlet tube 2000 and a guide 2100. Dashed lines illustrate air flow through inlets 110 of a test chamber 100 through the guide 2100 and a passageway 320 of the support 300 and out of the outlet 120 of the test chamber 100. A first end 2102 of the guide 2100 is sealed to an upper surface 150 of the test chamber 100 that comprises the introduction opening 130. A second end 2104 of the guide is sealed to a surface of the support 300. The guide 2100 has axially arranged guide inlets 2106 to allow air that flows through the inlets 110 of the test chamber 100 to flow into the interior volume of the guide 2100 and through the passageway 320 of the support 300 and out of the outlet 120 of the test chamber 100. The test pollutant inlet tube 2000 surrounds the introduction opening 130 and extends into the guide 2100 a distance beyond the guide inlets 2106. Aerosol 2200 comprising test pollutant is introduced by introduction system 200 through the introduction opening 130 and the test pollutant inlet tube 2000 and flows into the guide 2100, which directs the aerosol 2200 comprising the test pollutant to the passageway 320 of the support 300. The air (shown by dashed lines) that comes through guide inlets 2106 flows along an exterior surface of the test pollutant inlet tube 2000, which introduces more laminar, and less turbulent flow, of the air. At least some of the laminar aspects of the air flow are maintained as the air flows towards the second end 2104 of the guide 2100, which reduces interaction of the aerosol 2200 with interior surfaces of the guide 2100. This may reduce loss of test pollutant to sorption, which may improve experimental accuracy, reliability, or accuracy and reliability of the apparatus.

FIGS. 4-8 illustrate an example of a support 300 and a test pollutant collector 700. The support 300 comprises a housing 310 that may be mounted to a test chamber around an outlet (such as outlet 120 of FIG. 1) with bolts 311. The support 300 comprises an insert 360 configured to be inserted through the outlet of the test chamber. The insert 360 is configured to reversibly couple to the housing 310 through, for example, a thread engagement or a twist and lock engagement. O-rings 365 may facilitate sealing between the housing 310 and the insert 360.

The housing 310 and the insert 360 together define a passageway 320 through the support 300. Air from the test chamber may flow through the passageway 320 through the outlet. The insert 360 comprises a coupling 380 for connecting to conduit 410, such as tubing, to connect with the air flow apparatus, which may draw air from the test chamber through the passageway 320.

The support 300 comprises a retention assembly 350 that may be mounted to the housing 310 with bolts 351. The retention assembly 350 retains a test article 999 comprising filter medium such that when air flows from the test chamber through the passageway 320, the air passes through the filter medium. The retention assembly 350 comprises a clamping disc 355 comprising apertures through which bolts 351 extend, a top test article sealing disc 330, a bottom test article sealing disc 335, a height adjustment disc 340, and O-ring sealing disc 333. The test article 999 may be placed on the bottom test article sealing disc 335, the height adjustment disc 340 may be placed on the test article 999, the top test article sealing disc 330 may be placed on the height adjustment disc 340, the clamping disc 355 may be placed on the top test article sealing disc 330, and the assembly may be tightened relative to the housing 310 with bolts 351 to retain the test article 999.

A handle 370 is coupled to the insert 360 to facilitate grasping and twisting of insert 360 to engage or disengage the insert 360 from the housing 310. The insert 360 may be removed through the outlet (such as outlet 120 in FIG. 1) of the test chamber. The test pollutant collector 700 is retained on the insert 360. When the insert 360 is removed through the outlet of the test chamber, the test pollutant collector 700 is also removed. Accordingly, the test pollutant collector 700 may be removed from test chamber without accessing the interior of the test chamber.

The test pollutant collector 700 includes a cup 710 and a holder 730. The holder 730 comprises a receptacle 737 for receiving and retaining the cup 710. Material 720 configured to trap a test pollutant is disposed in the cup 710. The material 720 may comprise a hydrogel when the test pollutant comprises a biological material such as a virus. A funnel element 800, such as cascade impactor ring, directs air flowing through the passageway 320 to the material 720 such that the air impacts the material 720. After the air impacts the material 720, the air may flow through lateral apertures 735 of the holder 730 so that the air may continue to flow through the passageway 320 to exit the test chamber.

Figure 8:
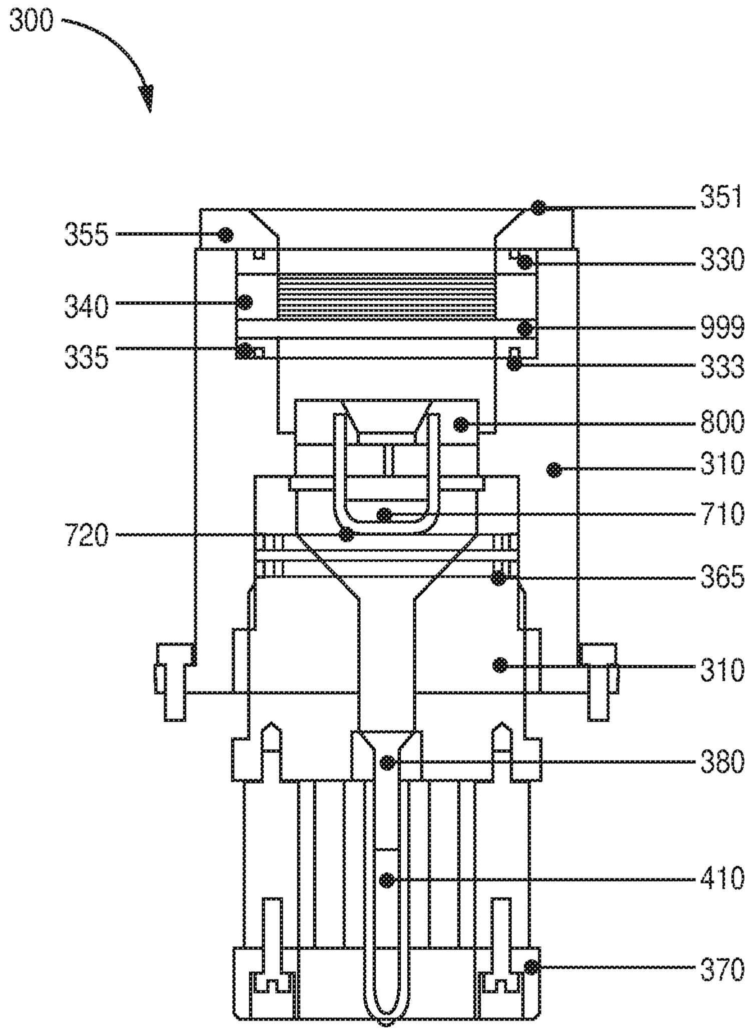
FIG. 8 is a schematic sectional view of a test pollutant collector.
Figure 9:
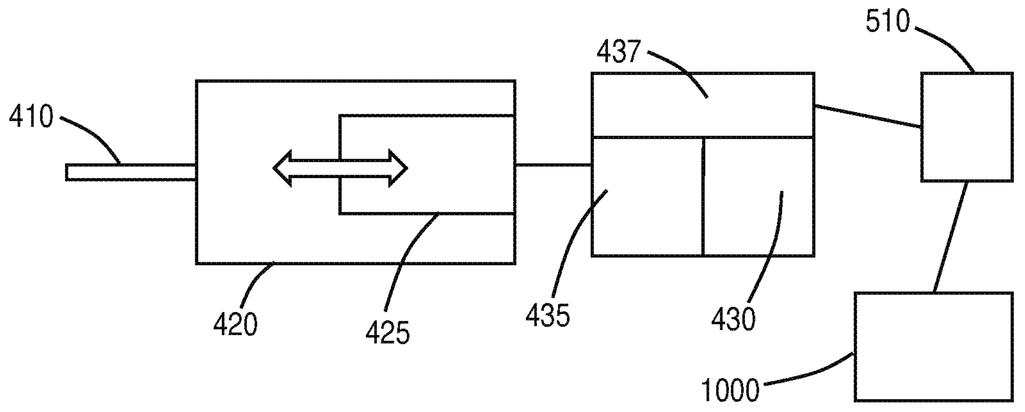
FIG. 9 is a block diagram of some components of air flow apparatus and respiratory conditions simulation system.

FIG. 9 illustrates some components of an example of air flow apparatus and respiratory conditions simulation system. The airflow apparatus comprises a piston pump 420 comprising a piston 425. The pump 420 is operably coupled to conduit 410 that is coupled to the insert of the support (for example, as shown in FIG. 8) so that movement of the piston 425 causes air to be withdrawn from the test chamber through the passageway of the support to conduit 410 or be introduced through conduit 410 and passageway of the support and into the test chamber, depending on which direction the piston 425 moves.

The piston 425 is operably coupled to a motor 430. The motor 430 may be configured to provide linear movement or rotary movement. If the motor 430 provides rotary movement, the motor 430 may comprise a movement translator 435 to convert rotary movement to linear movement. The motor 435 comprises a coder 437 for controlling the motor. The coder 437 is operably coupled to a motion controller 510 that provides instructions to the motor 430 to cause the piston 425 to move in a manner that simulates one or more aspects of inhalation or exhalation, such as rate, volume, duration, and periodicity. The motion controller 510 may be operably coupled to a system controller 1000, which may be operably coupled to a user interface.

Figure 10:
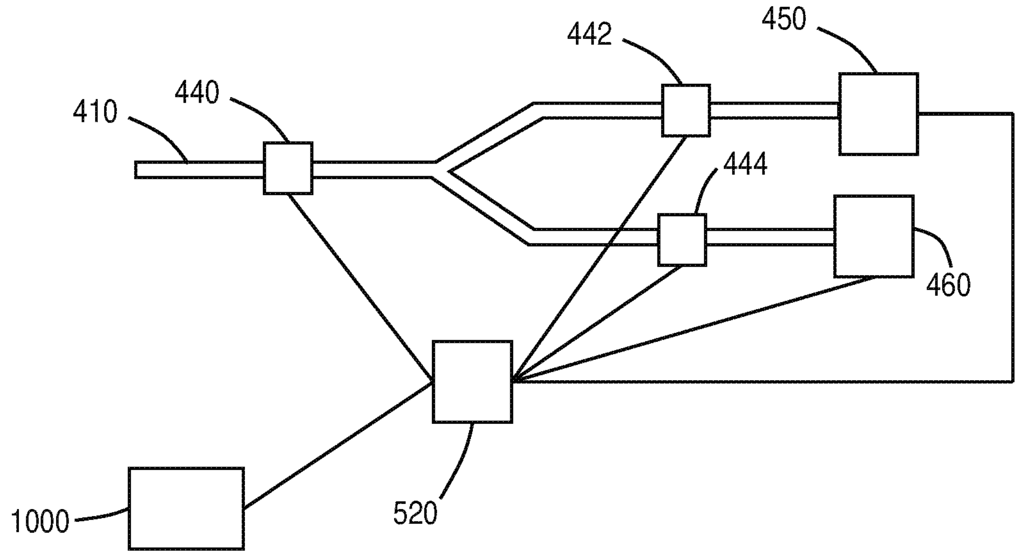
FIG. 10 is a block diagram of some components of air flow apparatus and respiratory conditions simulation system.

FIG. 10 illustrates some components of an example of air flow apparatus and respiratory conditions simulation system. The airflow apparatus comprises a positive pressure pump 450, a vacuum pump 460, a first valve 442, a second valve 444, and a differential flow controller 440, coupled to conduit 410 that is coupled to the insert of the support (for example, as shown in FIG. 8). A controller 520 is operably coupled to the first valve 442, the second valve 444, and the differential flow controller 440, and may be operably coupled to the positive pressure pump 450 and the vacuum pump 460. The controller 520 may cause the first 442 and second 444 valves to open or close based on input from the differential flow controller 440 to cause air to flow from the positive pressure pump 450 through the conduit 410 to the passageway of the support and into the test chamber or from the test chamber through the passageway of the support, through the conduit and towards the vacuum pump 460. The controller 520 may be operably coupled to a system controller 1000, which may be operably coupled to a user interface.

Figure 11:
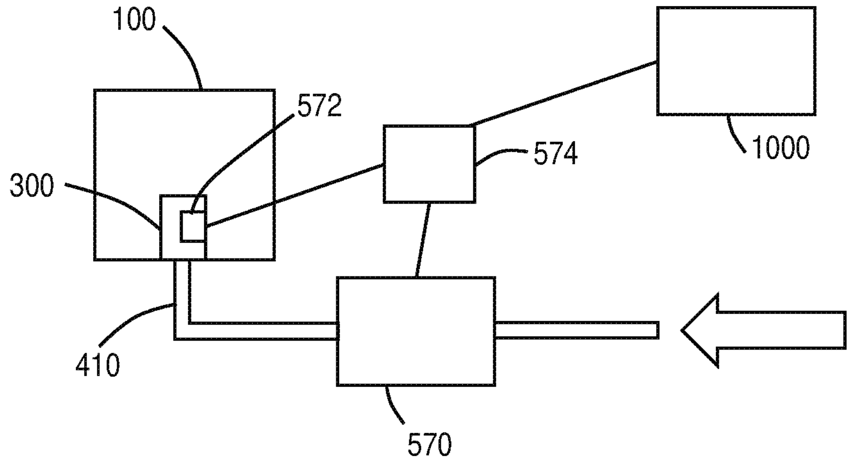
FIG. 11 is a block diagram of some components of an apparatus comprising a respiratory humidifier system.

FIG. 11 illustrates an example of an apparatus comprising a respiratory humidifier system. The apparatus includes a humidifier 570 positioned and configured to humidify air that flow from the air flow apparatus through the conduit 410, through the passageway of the support 300, and into the test chamber 100. A humidity sensor 572 is positioned in the passageway of the support 300. The humidity sensor 572 is operably coupled to humidity controller 574, which is operably coupled to the humidifier 570. The controller 574 causes the humidifier 570 to increase or decrease the humidity of the air based on input from the sensor 572. The humidity controller 574 may be operably coupled to a system controller 1000, which may be operably coupled to a user interface.

Figure 12:
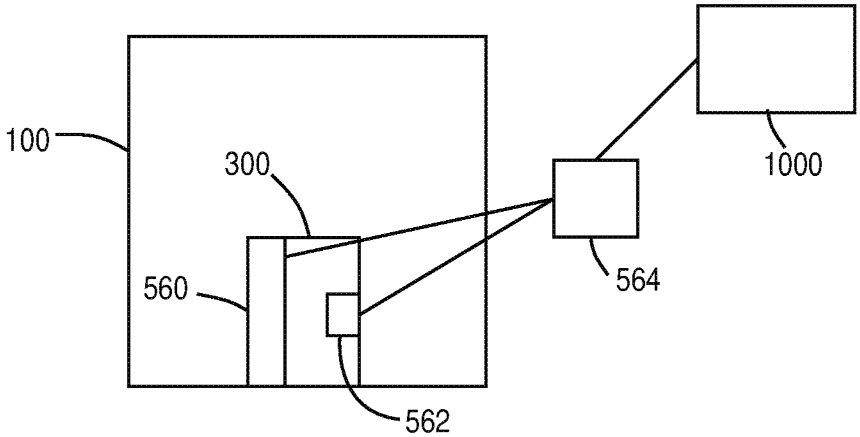
FIG. 12 is a block diagram of some components of an apparatus comprising a respiratory temperature control system.

FIG. 12 illustrates an example of an apparatus comprising a respiratory temperature control system. The system is configured to control the temperature of air in the passageway of the support 300 so that air that flowing from the passageway into the test chamber 100 is temperature regulated. The system comprises a heater 560 positioned and configured to heat air in the passageway, a temperature sensor 562 positioned and configured to detect temperature in the passageway, and a temperature controller 564 operably coupled to the temperature sensor 562 and the heater 560. The temperature controller 562 is configured to control the heater 560 to regulate the temperature of the air based on input from the temperature sensor 562. The temperature controller 564 may be operably coupled to a system controller 1000, which may be operably coupled to a user interface.

Figure 13:
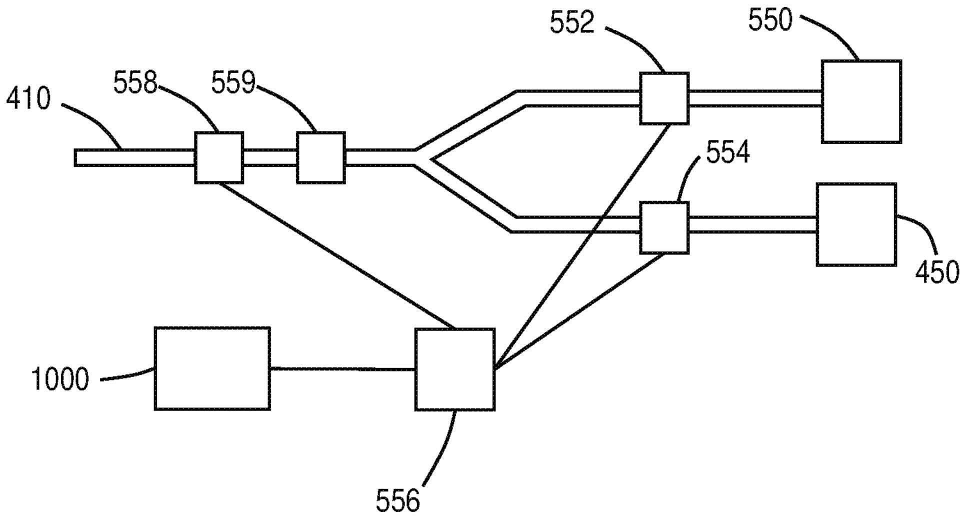
FIG. 13 is a block diagram of some components of an apparatus comprising a carbon dioxide control system.

FIG. 13 illustrates an example of an apparatus comprising a carbon dioxide control system. The system comprises a source of pressurized 100% carbon dioxide 550 operably coupled to a first valve 552, a positive pressure pump 450 operably coupled to a second valve 554, and an in-line mixer 559 upstream of the valves 552, 554. The system also comprises a carbon dioxide sensor 558 upstream of the mixer 559, a carbon dioxide controller 556 operably coupled to the carbon dioxide sensor 558 and the first 552 and second 554 valves. The controller 556 is configured to cause the first 552 and second 554 valves to open and close based on input from the sensor 558 to maintain a desired carbon dioxide concentration in air flowing through the conduit 410 into the passageway of the support and into the test chamber. The carbon dioxide controller 556 may be operably coupled to a system controller 1000, which may be operably coupled to a user interface.

Figure 14:
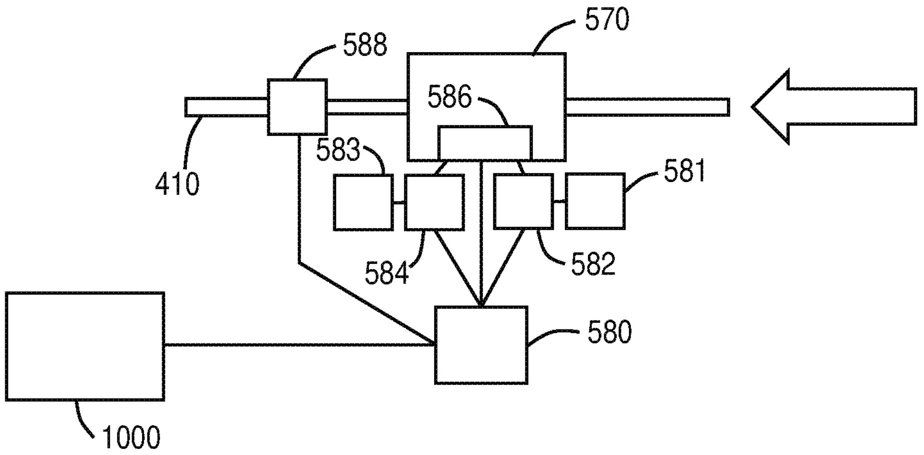
FIG. 14 is a block diagram of some components of an apparatus comprising a pH control system.

FIG. 14 illustrates an example of an apparatus comprising a pH control system. The system comprises a humidifier 570 having a reservoir containing water, a mixer 586 in the reservoir of the humidifier 570, an acid pump 582 coupled to an acid source 581 and configured to pump acid from the source 581 into the reservoir of the humidifier 470. The system also comprises an base pump 584 coupled to an base source 583 and configured to pump base from the source 583 into the reservoir of the humidifier 470, a pH sensor 588 upstream of the reservoir 570, and a pH controller 580. The pH controller 580 is operably coupled to the pH sensor 588, the acid pump 582, the base pump 584, and the mixer 586. The pH controller 580 may cause the acid pump 582 or the base pump 584 to pump acid or base into the reservoir of the humidifier 570 and to activate the mixer 586 based on input from the pH sensor 588. The pH controller 580 may be operably coupled to a system controller 1000, which may be operably coupled to a user interface.

Figure 15:
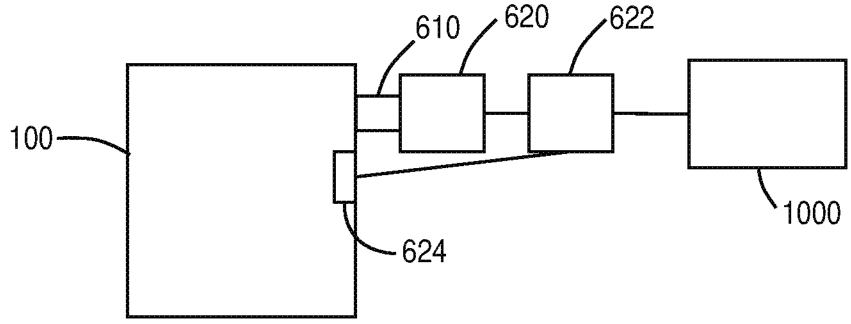
FIG. 15 is a block diagram of some components of an external system temperature control system.

FIG. 15 illustrates an example of some components of an external environment simulation system having a temperature control system. The temperature control system includes a temperature control unit 620 operably coupled to a valve 610 that is operably coupled to an inlet of the test chamber 100. The temperature control unit 620 may include a heater, a cooler, or a heater and a cooler. The system includes a temperature sensor 624 positioned and configured to measure the temperature of air entering the test chamber 100 through the inlet. The temperature sensor 624 is operably coupled to a temperature controller 622, which is operably coupled to the temperature control unit 620. The temperature controller 622 is configured to cause the temperature control unit 620 to adjust the temperature of air entering the test chamber based on input from the temperature sensor 624. The temperature controller 622 may be operably coupled to a system controller 1000, which may be operably coupled to a user interface.

Figure 16:
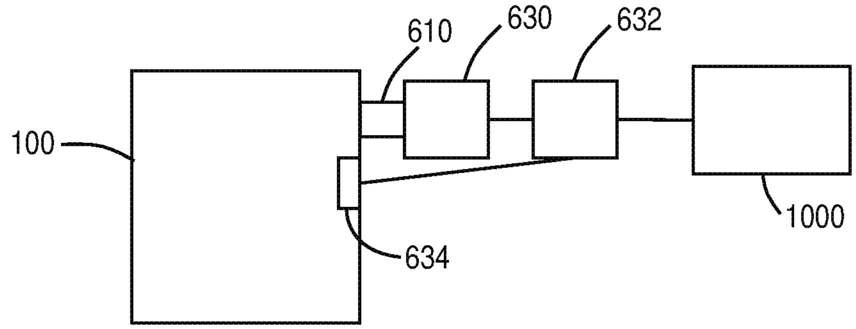
FIG. 16 is a block diagram of some components of an external system humidity control system.

FIG. 16 illustrates an example of some components of an external environment simulation system having a humidity control system. The humidity control system includes a humidity control unit 630 operably coupled to a valve 610 that is operably coupled to an inlet of the test chamber 100. The humidity control unit 630 may include a humidifier, a dehumidifier, or a humidifier and a dehumidifier. The system includes a humidity sensor 634 positioned and configured to measure the humidity of air entering the test chamber 100 through the inlet. The humidity sensor 634 is operably coupled to a humidity controller 632, which is operably coupled to the humidity control unit 630. The humidity controller 632 is configured to cause the humidity control unit 630 to adjust the humidity of air entering the test chamber based on input from the humidity sensor 634. The humidity controller 632 may be operably coupled to a system controller 1000, which may be operably coupled to a user interface.

Figure 17:
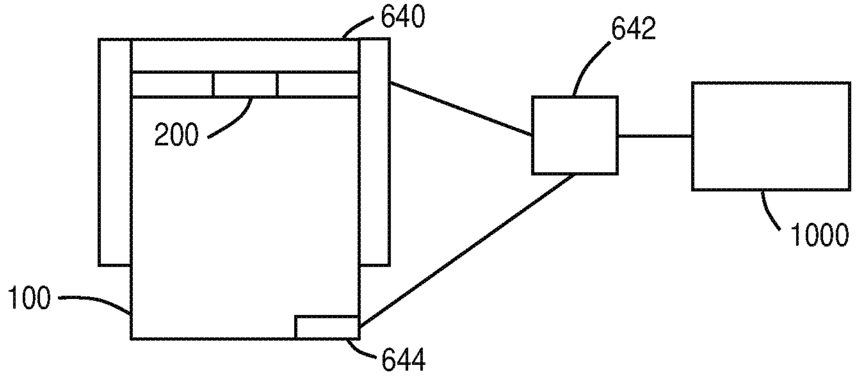
FIG. 17 is a block diagram of some components of an external system UV light control system.

FIG. 17 illustrates an example of some components of an external environment simulation system having a UV light control system. The UV light control system includes a UV light source 640 positioned external to the test chamber 100. The test chamber 100 or portions of the test chamber 100 are UV transparent to allow UV light from the source to pass through the interior of the test chamber 100. The UV source 640 may be positioned over the test pollutant introducer 200. The UV system includes a UV sensor 644 positioned in the test chamber 100 and a UV controller 642. The UV sensor 644 may detect UV light intensity, wavelength, or intensity and wavelength. The UV controller 642 is operably coupled to the UV light source 640 and the UV sensor 644 and is configured to cause the UV light source to adjust intensity, spectral output, or intensity and spectral output based on input from the UV sensor 644. The UV controller 642 may be operably coupled to a system controller 1000, which may be operably coupled to a user interface.

Figure 18:
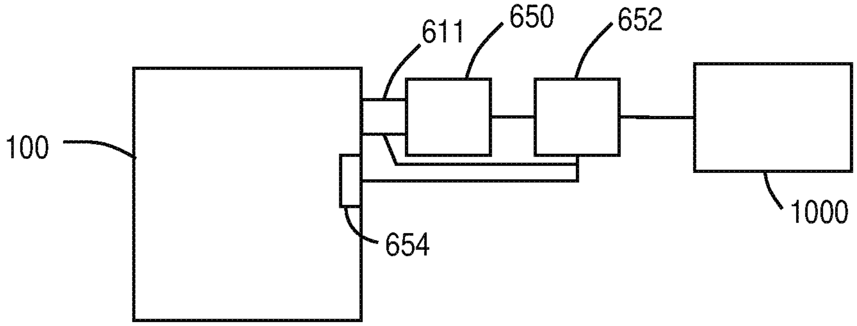
FIG. 18 is a block diagram of some components of an environmental air pollutant control system.

FIG. 18 illustrates an example of some components of an environmental air pollutant control system. The system includes a pollutant introducer 650, which may comprise an aerosol generator such as a nebulizer. The pollutant introducer 650 is operably coupled to a dilution valve 611 that may control the amount of pollutant that enters the inlet of the test chamber 100. The system includes a pollution sensor 654 positioned and configured to detect the amount of environmental pollutant entering the test chamber 100 through the inlet. The system includes a pollutant controller 652 operably coupled to the pollutant introducer 650, the dilution valve 611, and the pollutant sensor 654. The pollutant controller 650 controls the pollutant introducer 650 and the dilution valve 611 to control the amount of pollutant that enters the test chamber through the inlet based on input from the pollutant sensor 654. The pollutant controller 652 may be operably coupled to a system controller 1000, which may be operably coupled to a user interface.

It will be understood that one or more of, or all, the systems depicted in FIGS. 9-18 may be included in a test apparatus as described in the present disclosure.

For the purpose of the present description and of the appended claims, except where otherwise indicated, all numbers expressing amounts, quantities, percentages, and so forth, are to be understood as being modified in all instances by the term “about”. Also, all ranges include the maximum and minimum points disclosed and include any intermediate ranges therein, which may or may not be specifically enumerated herein. In this context, therefore, a number A is understood as A±2% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An apparatus for assessing a filter medium of a test article, comprising:

a test chamber comprising an introduction opening on a surface of the test chamber, an inlet, and an outlet;

an introduction system configured to introduce a test pollutant through the introduction opening into the test chamber such that the test pollutant is entrained in air flowing from the inlet to the outlet;

a support configured to retain the test article, wherein the support defines a passageway downstream of a location of the test article such that air flowing from the inlet to the outlet passes through the filter medium prior to entering the passageway;

an air flow apparatus configured to draw air from within the test chamber through the passageway and the outlet, and also configured to introduce air through the outlet and the passageway into the test chamber a test pollutant collector positioned in an airflow path within the passageway such that air drawn from the test chamber through the passageway contacts the test pollutant collector and a respiratory conditions simulation system configured to simulate an aspect of respiration, or an external environment simulation system configured to simulate an aspect of an external environment, or both the respiratory conditions simulation system and the external environment simulation system.

2. The apparatus according to claim 1, comprising a guide comprising an interior surface to direct air flow from the introduction opening towards the passageway of the support.

3. The apparatus according to claim 2, comprising a test pollutant inlet tube surrounding the introduction opening and extending from the surface of the test chamber into an interior volume of the guide.

4. The apparatus according to claim 2, wherein the guide has a first end and a second end, wherein the first end is sealed relative to the surface of the test chamber around the introduction opening, and wherein the second end is sealed relative to a surface of the support.

5. The apparatus according to claim 4, wherein the guide comprises a guide air inlet in proximity to the first end of the guide.

6. The apparatus according to claim 3, wherein the guide comprises a guide air inlet in proximity to the first end of the guide, and wherein the test pollutant inlet tube extends into the interior volume of the guide towards the second end of the guide, beyond the first guide air inlet.

7. The apparatus according to claim 1, wherein the respiratory conditions simulation system comprises an air flow apparatus controller operably coupled to the air flow apparatus, wherein the air flow apparatus controller is configured to cause the air flow apparatus to alternate between drawing air from the test chamber through the passageway and the outlet and introducing air through the outlet and the passageway into the test chamber.

8. The apparatus according to claim 1, wherein the respiratory conditions simulation system comprises a humidifier, wherein the humidifier is operably coupled to the air flow apparatus and configured to cause air that is introduced through the outlet and the passageway into the test chamber to have a regulated humidity.

9. The apparatus according to claim 1, wherein the respiratory conditions simulation system comprises a heating system arranged and configured to cause air that is introduced by the air flow apparatus through the outlet and the passageway into the test chamber to have a regulated temperature when in the passageway.

10. The apparatus according to claim 1, wherein the respiratory conditions simulation system comprises a carbon dioxide concentration controller system configured to introduce carbon dioxide to air that is introduced through the outlet and the passageway into the test chamber such that the percentage of carbon dioxide in the air in the passageway may be regulated to a desired range.

11. The apparatus according to claim 1, wherein the respiratory conditions simulation system comprises a pH controller system, wherein the pH controller system comprises a pH controller apparatus configured to control the pH of air caused by the air flow apparatus to be introduced through the outlet and the passageway into the test chamber.

12. The apparatus according to claim 1, wherein the apparatus comprises the external environment simulation system, wherein the external environment simulation system comprises one or more of an external temperature control system configured to cause temperature regulated air to enter the test chamber via the inlet, an external humidity control system configured to cause humidity-regulated air to enter the test chamber via the inlet, and an ultraviolet light source configured to cause ultraviolet light to pass through an interior of the test chamber.

13. The apparatus according to claim 12, wherein the external environment simulation system comprises a dilution valve operably coupled to the inlet, wherein the dilution valve is configured to introduce an environmental air pollutant into the test chamber through the inlet.

14. The apparatus according to claim 1, wherein the test chamber is electrically grounded.

* * * * *